United States Patent
Baek et al.

(10) Patent No.: US 12,078,582 B2
(45) Date of Patent: Sep. 3, 2024

(54) VISCOMETER WITH REDUCED DEAD-VOLUME AND HIGH DYNAMIC RANGE

(71) Applicant: Rheosense, Inc., San Ramon, CA (US)

(72) Inventors: Seong-Gi Baek, Pleasanton, CA (US); Stacey Lynn Elliott, Pleasanton, CA (US)

(73) Assignee: Rheosense, Inc.

( * ) Notice: Subject to any disclaimer, the term of this patent is extended or adjusted under 35 U.S.C. 154(b) by 45 days.

(21) Appl. No.: 17/741,350

(22) Filed: May 10, 2022

(65) Prior Publication Data

US 2022/0357258 A1    Nov. 10, 2022

Related U.S. Application Data

(60) Provisional application No. 63/186,662, filed on May 10, 2021.

(51) Int. Cl.
*G01N 11/08* (2006.01)
*G01N 11/00* (2006.01)

(52) U.S. Cl.
CPC ...... *G01N 11/08* (2013.01); *G01N 2011/0013* (2013.01); *G01N 2011/0026* (2013.01)

(58) Field of Classification Search
None
See application file for complete search history.

(56) References Cited

U.S. PATENT DOCUMENTS

| | | |
|---|---|---|
| 3,143,393 A | 8/1964 | De Seguin Des Hons |
| 3,266,299 A | 8/1966 | Swank |
| 3,683,678 A | 8/1972 | Yau |
| 3,990,295 A | 11/1976 | Renovanz et al. |
| 4,122,708 A | 10/1978 | Maier |
| 4,141,252 A | 2/1979 | Lodge |
| 4,241,602 A | 12/1980 | Han et al. |

(Continued)

FOREIGN PATENT DOCUMENTS

| | | |
|---|---|---|
| CA | 2131653 A1 | 3/1995 |
| CN | 87209341 U | 8/1988 |

(Continued)

OTHER PUBLICATIONS

Baek, Notice of Allowance, U.S. Appl. No. 15/290,936, May 14, 2019, 9 pgs.

(Continued)

*Primary Examiner* — Patrick Assouad
*Assistant Examiner* — Mark A Shabman
(74) *Attorney, Agent, or Firm* — Morgan, Lewis & Bockius LLP

(57) ABSTRACT

A viscometer includes a viscosity sensor with a liquid flow channel for measuring a viscosity of a liquid flowing through the liquid flow channel, a manifold with an inlet and an outlet for receiving a liquid sample through the inlet of the manifold and providing the received liquid sample through the outlet of the manifold to the viscosity sensor, and a pump coupled with the manifold for causing an in-flow of the liquid sample into the manifold through the inlet of the manifold and an out-flow of the received liquid sample from the manifold through the outlet of the manifold. Also disclosed is a viscosity sensor module with two or more viscosity sensors.

20 Claims, 16 Drawing Sheets

(56) References Cited

U.S. PATENT DOCUMENTS

| | | | |
|---|---|---|---|
| 4,284,604 A | 8/1981 | Tervamaki | |
| 4,422,210 A | 12/1983 | Bergsand et al. | |
| 4,574,622 A | 3/1986 | Hatfield | |
| 4,624,132 A | 11/1986 | Parnaby et al. | |
| 4,793,174 A | 12/1988 | Yau | |
| 4,874,500 A | 10/1989 | Madou et al. | |
| 4,878,378 A | 11/1989 | Harada | |
| 4,894,698 A | 1/1990 | Hijikigawa et al. | |
| 4,916,678 A | 4/1990 | Johnson et al. | |
| 4,920,787 A | 5/1990 | Dual et al. | |
| 5,029,479 A | 7/1991 | Bryan | |
| 5,058,435 A | 10/1991 | Terry et al. | |
| 5,165,292 A | 11/1992 | Prohaska | |
| 5,189,777 A | 3/1993 | Guckel et al. | |
| 5,202,939 A | 4/1993 | Belleville et al. | |
| 5,225,959 A | 7/1993 | Stearns | |
| 5,304,487 A | 4/1994 | Wilding et al. | |
| 5,317,870 A | 6/1994 | Inagawa | |
| 5,317,908 A | 6/1994 | Fitzgerald et al. | |
| 5,347,851 A | 9/1994 | Grudzien, Jr. et al. | |
| 5,388,447 A | 2/1995 | Fitch et al. | |
| 5,392,117 A | 2/1995 | Belleville et al. | |
| 5,485,753 A | 1/1996 | Burns et al. | |
| 5,486,335 A | 1/1996 | Wilding et al. | |
| 5,503,003 A | 4/1996 | Brookfield | |
| 5,602,339 A | 2/1997 | Wareham | |
| 5,663,503 A | 9/1997 | Dam et al. | |
| 5,756,883 A | 5/1998 | Forbes | |
| 5,770,160 A | 6/1998 | Smith et al. | |
| 5,847,268 A * | 12/1998 | Ball | G01N 11/08 73/54.04 |
| 5,877,409 A | 3/1999 | Girling | |
| 5,983,727 A | 11/1999 | Wellman et al. | |
| 6,010,461 A | 1/2000 | Haniff et al. | |
| 6,032,689 A | 3/2000 | Tsai et al. | |
| 6,062,088 A | 5/2000 | Ingrisch et al. | |
| 6,078,706 A | 6/2000 | Nau et al. | |
| 6,085,596 A | 7/2000 | Jensen et al. | |
| 6,216,528 B1 | 4/2001 | Carrell et al. | |
| 6,237,398 B1 | 5/2001 | Porat et al. | |
| 6,240,770 B1 | 6/2001 | Raffer | |
| 6,338,284 B1 | 1/2002 | Najafi et al. | |
| 6,393,898 B1 | 5/2002 | Hajduk et al. | |
| 6,499,336 B1 | 12/2002 | Raffer | |
| 6,575,019 B1 * | 6/2003 | Larson | G01N 11/08 73/54.04 |
| 6,681,616 B2 | 1/2004 | Spaid et al. | |
| 6,725,725 B1 | 4/2004 | Werner et al. | |
| 6,840,092 B2 | 1/2005 | Eggen et al. | |
| 6,892,583 B2 | 5/2005 | Baek | |
| 7,290,441 B2 | 11/2007 | Baek | |
| 7,730,769 B1 | 6/2010 | Kwon et al. | |
| 11,624,692 B2 | 4/2023 | Baek | |
| 2002/0011095 A1 | 1/2002 | Park et al. | |
| 2002/0148282 A1 | 10/2002 | Hajduk et al. | |
| 2003/0079547 A1 | 5/2003 | Baek | |
| 2003/0182991 A1 | 10/2003 | Spaid et al. | |
| 2004/0037739 A1 | 2/2004 | McNeely et al. | |
| 2004/0123649 A1 | 7/2004 | Spaid et al. | |
| 2005/0005684 A1 | 1/2005 | Chien | |
| 2005/0183496 A1 | 8/2005 | Baek | |
| 2005/0210964 A1 | 9/2005 | Baek | |
| 2006/0003439 A1 | 1/2006 | Ismagilov et al. | |
| 2006/0019407 A1 | 1/2006 | Fulton et al. | |
| 2006/0070426 A1 * | 4/2006 | Pelletier | G01N 11/04 73/54.02 |
| 2006/0162438 A1 | 7/2006 | Schofield et al. | |
| 2006/0263263 A1 | 11/2006 | Shimizu | |
| 2008/0125700 A1 | 5/2008 | Moberg et al. | |
| 2008/0127717 A1 | 6/2008 | Lesieur | |
| 2008/0127718 A1 * | 6/2008 | Lesieur | G01N 11/08 73/1.03 |
| 2008/0134765 A1 | 6/2008 | Baek | |
| 2009/0004063 A1 | 1/2009 | Higashihara et al. | |
| 2009/0216465 A1 | 8/2009 | Millet | |
| 2010/0071442 A1 | 3/2010 | Moon, Jr. et al. | |
| 2012/0075949 A1 | 3/2012 | Norcross, Jr. | |
| 2012/0096929 A1 | 4/2012 | Baek | |
| 2013/0045498 A1 | 2/2013 | Abel et al. | |
| 2015/0168284 A1 | 6/2015 | Minton et al. | |
| 2017/0030818 A1 * | 2/2017 | Baek | G01N 33/487 |
| 2024/0085296 A1 | 3/2024 | Baek | |

FOREIGN PATENT DOCUMENTS

| | | |
|---|---|---|
| CN | 1449491 A | 10/2003 |
| CN | 101124467 A | 2/2008 |
| CN | 103080724 A | 5/2013 |
| CN | 203534932 U | 4/2014 |
| CN | 104272085 A | 1/2015 |
| CN | 105784547 A | 7/2016 |
| DE | 19750131 A1 | 6/1999 |
| DE | 10215946 A1 | 11/2003 |
| EP | 0067605 A1 | 12/1982 |
| JP | S 56157839 A | 12/1981 |
| JP | S 5745430 A | 3/1982 |
| JP | S 5888637 A | 5/1983 |
| JP | S 61107251 A | 5/1986 |
| JP | S 61190853 A | 8/1986 |
| JP | S 62194441 A | 8/1987 |
| JP | H 0618398 A | 1/1994 |
| JP | H 06201420 A | 7/1994 |
| JP | H 07502122 A | 3/1995 |
| JP | H 1151841 A | 2/1999 |
| JP | H 11194084 A | 7/1999 |
| JP | H 11248715 A | 9/1999 |
| JP | 2001264341 A | 9/2001 |
| JP | 2002048696 A | 2/2002 |
| JP | 2004028772 A | 1/2004 |
| JP | 2004532003 A | 10/2004 |
| JP | 2006030167 A | 2/2006 |
| JP | 3124779 U | 8/2006 |
| JP | 2006322850 A | 11/2006 |
| JP | 2007528501 A | 10/2007 |
| JP | 2008002899 A | 1/2008 |
| JP | 2008134159 A | 6/2008 |
| JP | 2008139229 A | 6/2008 |
| JP | 2011025148 A | 2/2011 |
| JP | 2011085503 A | 4/2011 |
| JP | 2011512538 A | 4/2011 |
| JP | 2013525799 A | 6/2013 |
| WO | WO 9312410 A1 | 6/1993 |
| WO | WO 9926048 A1 | 5/1999 |
| WO | WO 2003038388 A1 | 5/2003 |
| WO | WO 2005086883 A2 | 9/2005 |
| WO | WO 2009104065 A1 | 8/2009 |
| WO | WO 2011107472 A1 | 9/2011 |
| WO | WO 2014031639 A1 | 2/2014 |
| WO | WO 2015157698 A1 | 10/2015 |
| WO | WO2022240899 A1 | 11/2022 |

OTHER PUBLICATIONS

Baek, Notice of Allowance, U.S. Appl. No. 10/286,602, Sep. 29, 2004, 7 pgs.

Baek, Final Office Action, U.S. Appl. No. 11/132,093, Jan. 24, 2006, 10 pgs.

Baek, Office Action, U.S. Appl. No. 11/132,093, Aug. 8, 2005, 9 pgs.

Baek, Office Action, U.S. Appl. No. 11/078,015, Sep. 13, 2006, 8 pgs.

Baek, Final Office Action, U.S. Appl. No. 11/078,015, Mar. 27, 2007, 6 pgs.

Baek, Notice of Allowance, U.S. Appl. No. 11/078,015, Jul. 6, 2007, 4 pgs.

Baek, Notice of Allowance, U.S. Appl. No. 11/983,210, Apr. 12, 2010, 6 pgs.

Baek, Final Office Action, U.S. Appl. No. 11/983,210, Aug. 20, 2009, 9 pgs.

Baek, Office Action, U.S. Appl. No. 11/983,210, Dec. 16, 2008, 9 pgs.

(56) References Cited

OTHER PUBLICATIONS

Baek, Notice of Allowance, U.S. Appl. No. 13/094,710, dated Apr. 16, 2015, 7 pgs.
Baek, Final Office Action, U.S. Appl. No. 13/094,710, dated Dec. 29, 2014, 19 pgs.
Baek, Office Action, U.S. Appl. No. 13/094,710, dated Apr. 11, 2014, 17 pgs.
Baek, Office Action, U.S. Appl. No. 13/094,710, dated Dec. 24, 2015, 15 pgs.
Baek, Office Action, U.S. Appl. No. 13/094,710, dated Jul. 28, 2016, 17 pgs.
Baek, Office Action, U.S. Appl. No. 13/094,710, dated May 3, 2017, 17 pgs.
Baek, Final Office Action, U.S. Appl. No. 13/094,710, dated Dec. 8, 2017, 19 pgs.
Baek, Final Office Action, U.S. Appl. No. 13/094,710, dated Jun. 29, 2018, 22 pgs.
Baek, Final Office Action, U.S. Appl. No. 13/094,710, dated Apr. 18, 2019, 19 pgs.
Baek, Office Action, U.S. Appl. No. 15/290,936, Nov. 8, 2018, 20 pgs.
Baek, International Search Report and Written Opinion, PCT/US2011/034002, Jan. 18, 2012, 9 pgs.
Dziuban, J.A. et al., "Silicon Optical Pressure Sensor," Sensors and Actuators A (Physical), Apr. 1992, vol. A32, No. 1-3, pp. 628-631, Switzerland.
Chan M.A. et al., "A Micromachined Pressure Sensor with Fiber-Optic Interferometric Readout," Sensors and Actuators A (Physical), May 1994, vol. A43, No. 1-3, pp. 196-201, Switzerland.
Chien, R.D., et al., "Study on Rheological Behavior of Polymer Melt Flowing Through Micro-Channels Considering the Wall-Slip Effect," Journal of Micromechanics and Microengineering, 15, May 2005, pp. 1389-1396.
FISO Technologies, "Product Data Sheet, FOP-M In-Vivo Pressure Sensor," 2 pgs.
FISO Technologies, "Technical Note Series, Fiber-Optic Pressure Transducer," 4 pgs.
Lee, S.B. et al., "A Micromachined Interferometer for Dynamic High-Pressure Sensing (in automotive applications)," Sensors, Jun. 1996, vol. 13, No. 6, Helmers Publishing, USA.
Rheosense Inc., Communication Pursuant to Article 94(3) EPC, EP05728127.1, Jul. 12, 2013, 7 pgs.
Rheosense Inc., Communication Pursuant to Article 94(3) EPC, EP05728127.1, Mar. 13, 2009, 5 pgs.
Rheosense Inc., Communication Pursuant to Article 94(3) EPC, EP02802527.8, Nov. 6, 2013, 8 pgs.
Rheosense Inc., Communication Pursuant to Article 94(3) EPC. EP02802527.8, Jan. 18, 2011, 7 pgs.
Rheosense Inc., Intent to Grant, EP02802527.8, Jul. 5, 2017, 5 pgs.
Rheosense Inc., Communication Pursuant to Rules 161(2) and 162. EP15777447.2, Mar. 20, 2017, 2 pgs.
Rheosense Inc., First Office Action, CN201180031161.1, May 6, 2014, 29 pgs.
Rheosense Inc., Second Office Action, CN201180031161.1, Jan. 9, 2015, 21 pgs.
Rheosense Inc., Third Office Action, CN201180031161.1, Jul. 13, 2015, 5 pgs.
Rheosense Inc., Ist Office Action, CN201610164123.8, Dec. 26, 2017, 17 pgs.
Rheosense Inc., 2nd Office Action, CN201610164123.8, Nov. 15, 2018, 13 pgs.
Rheosense Inc., International Search Report and Written Opinion, PCTUS2008082669, Jun. 29, 2009, 7 pgps.
Rheosense Inc. (Baek), International Search Report and Written Opinion, PCTUS2005/007869, Sep. 21, 2006, 4 pgs.
Rheosense Inc., International Preliminary Report on Patentability, PCTUS2005/007869, Oct. 18, 2006, 4 pgs.
Rheosense Inc., International Search Report, PCTUS2002/35290, Mar. 24, 2003, 1 pg.
Rheosense Inc., International Preliminary Examination Report, PCTUS2002/35290, Nov. 8, 2004 3 pgs.
Rheosense Inc., International Search Report and Written Opinion, PCTUS2015/025417, Jul. 24, 2015, 20 pgs.
Rheosense Inc., International Prliminary Report on Patentability, PCTUS2015/025417, Oct. 12, 2016, 18 pgs.
Rheosense Inc., Notification to Grant Patent, CN200580014842.1, Dec. 2, 2010, 2 pgs.
Rheosense Inc., Second Office Action, CN200580014842.1, Jul. 12, 2010, 6 pgs.
Rheosense Inc., First Office Action, CN200580014842.1, Jan. 16, 2009, 13 pgs.
Rheosense Inc., Extended European Search Report, EP11777928.0, Oct. 10, 2017, 11 pgs.
Rheosense Inc., Communication Pursuant to Rules 70(2) and 70a(2), EP11777928.0, Nov. 7, 2017, 1 pg.
Rheosense Inc., Certificate of Patent, JP2007-502978, Sep. 16, 2011, 3 pgs.
Rheosense Inc., Notification of Reasons for Rejection, JP2007-502978, Nov. 9, 2010, 2 pgs.
Rheosense Inc., Certificate of Patent, JP2013-508172, Nov. 18, 2016, 4 pgs.
Rheosense Inc., Notification to Grant Patent, CN02826519.X, Dec. 28, 2007, 2 pgs.
Rheosense Inc., First Office Action, CN02826519.X, Oct. 21, 2005, 10 pgs.
Rheosense Inc., CN201580030961.X, First Office Action, Aug. 31, 2018, 4 pgs.
Rheosense Inc., Certificate of Patent, JP2003-540610, Mar. 6, 2009, 2 pgs.
Rheosense Inc., Notification of Reason for Rejection, JP2003-540610, Jul. 29, 2008, 2 pgs.
Rheosense Inc., Certificate of Patent, JP2008-159808, Jul. 8, 2011, 3 pgs.
Rheosense Inc., Notification of Reason for Rejection, JP2008-159808, Dec. 14, 2010, 1 pg.
Rheosense Inc., Notification of Reason for Rejection, JP2017-504623, Dec. 26, 2017, 16 pgs.
Rheosense Inc., JP2017504623, Notice of Reasons for Refusal, Nov. 20, 2018, 17 pgs.
Rheosense Inc., Letters Patent, KR10-2004-7006615, Apr. 26, 2010, 2 pgs.
Rheosense Inc., KIPO's Notice of Preliminary Rejection, KR10-2004-7006615, Sep. 11, 2009, 7 pgs.
Rodd, et al., "The Inertio-Elastic Planar Entry Flow of Low Viscosity Elastic Fluids in Micro-Fabricated Geometries," Journal of Non-Newtonian Fluid Mechanics 129, Jan. 2005, pp. 1-22.
Wagner, C. et al., "Optical Pressure Sensor Based on a Mach-Zehnder Inteferometer Integrated with a Lateral a-Si: H p-i-n Photodiode," IEEE Photonics Technology Letters, Oct. 1993, vol. 5, No. 10, pp. 1257-1259, USA.
Rheosense, Inc. International Preliminary Report on Patentability, PCT/US2017/056097, Apr. 16, 2019, 10 pgs.
Rheosense, Inc. International Search Report / Written Opinion, PCT/US2017/056097, Dec. 18, 2017, 12 pgs.
Baek, Non-Final Office Action, U.S. Appl. No. 16/532,241, Mar. 16, 2021, 11 pgs.
Baek, Notice of Allowance, U.S. Appl. No. 16/532,241, Jun. 30, 2021, 8 pgs.
Baek, Notice of Allowance, U.S. Appl. No. 13/094,710, Jul. 3, 2019, 7 pgs.
Baek, Notice of Allowance, U.S. Appl. No. 13/094,710, Sep. 13, 2019, 4 pgs.
Baek, Notice of Allowance, U.S. Appl. No. 15/290,936, Jul. 11, 2019, 9 pgs.
Baek, Notice of Allowance, U.S. Appl. No. 15/590,936, Jul. 22, 2019, 5 pgs.
McCreary et al., "Precision Capacitor Ratio Measurement Technique for Integrated Circuit Capacitor Arrays", IEEE Transactions on Instrumentation and Measurement, 19790301 (vol. 28, Issue: 1, Mar. 1979), XP002024783 ,7 pgs.
Rheosense Inc., JP2013508172, Search Report by Registered Search Organization, Mar. 6, 2015, 17 pgs.

(56) References Cited

OTHER PUBLICATIONS

Rheosense Inc., JP2013508172, Notice of Reasons for Refusal, Feb. 19, 2016, 4 pgs.
Rheosense Inc., CN201610164123.8, Third Office Action, Mar. 21, 2019, 10 pgs.
Rheosense Inc., CN201610164123.8, Notification to Grant Right for Invention, Aug. 12, 2019, 3 pgs.
Rheosense Inc., CN201580030961.X, Third Office Action, May 11, 2020, 18 pgs.
Baek, Notice of Allowance, U.S. Appl. No. 17/497,723, Mar. 21, 2023, 2 pgs.
Rheosense, Inc., PCT/US2022/028625, International Search Report and Written Opinion, Oct. 5, 2022, 13 pgs.
Rheosense, Inc., PCT/US2022/028625, International Preliminary Report on Patentability, Nov. 14, 2023, 7 pgs.
Baek, Non-Final Office Action, U.S. Appl. No. 18/299,003, Jan. 18, 2024, 6 pgs.

* cited by examiner

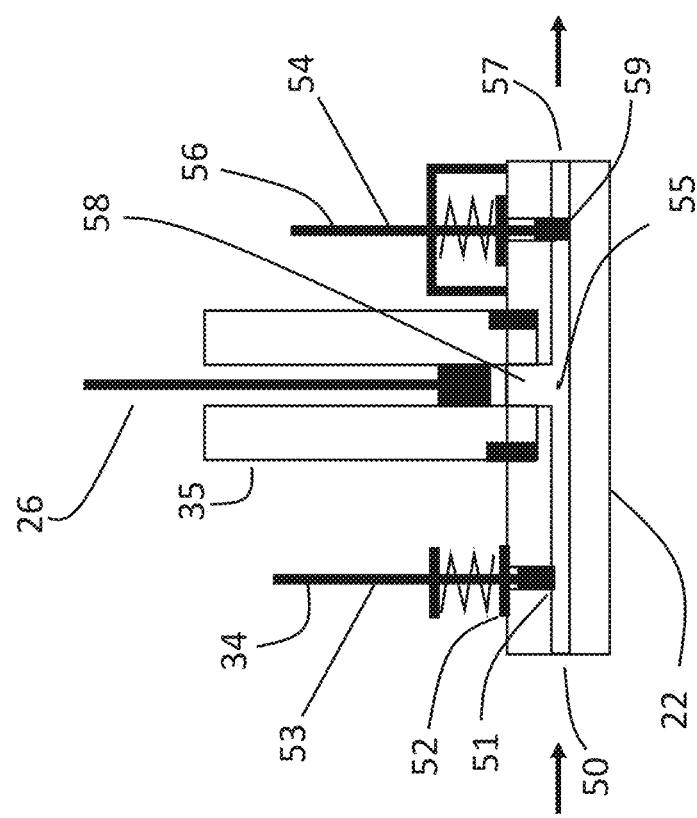

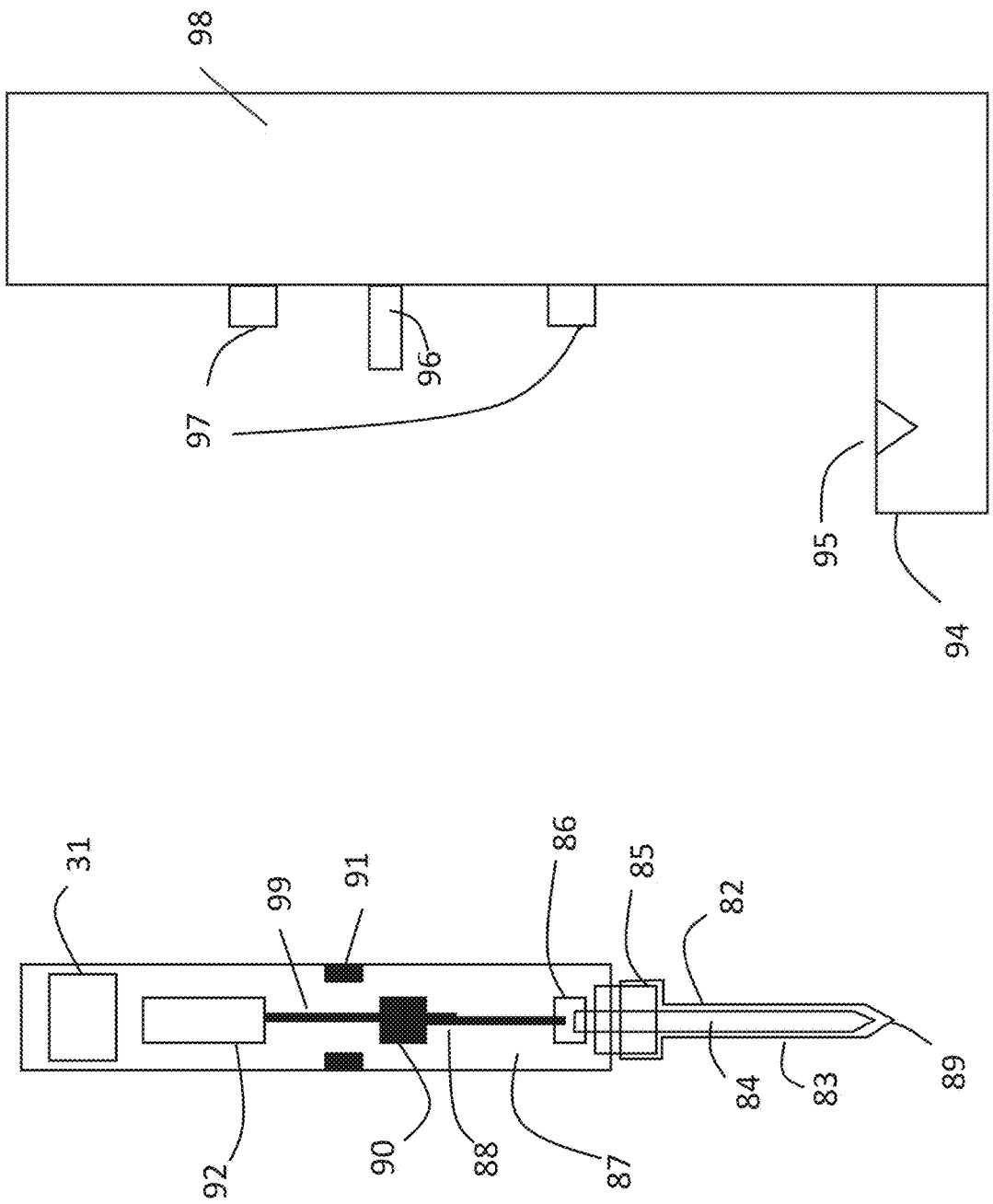

- Injection force at different shear rates or injection rates
- L³ or interaction changes over time due to aggregation propensity changes
- Weakly interacting particles like mAb can be analyzed at the formulation concentration.

VISCOMETER WITH REDUCED DEAD-VOLUME AND HIGH DYNAMIC RANGE

RELATED APPLICATIONS

This application claims the benefit of, and priority to, U.S. Provisional Patent Application Ser. No. 63/186,662, filed May 10, 2021, which is incorporated by reference herein in its entirety.

This application is related to U.S. patent application Ser. No. 11/078,015, filed Mar. 11, 2005, now U.S. Pat. No. 7,290,441, which claims priority to U.S. Provisional Patent Application Ser. No. 60/552,289, filed Mar. 11, 2004 and is a continuation-in-part application of U.S. patent application Ser. No. 10/286,602, filed Oct. 31, 2002, now U.S. Pat. No. 6,892,583, which claims priority to U.S. Provisional Patent Application Ser. No. 60/335,375, filed Oct. 31, 2001. All of these applications are incorporated by reference herein in their entireties.

TECHNICAL FIELD

This application relates generally to viscometers, and more particularly to viscometers that measures viscosity of liquids in a semi-continuous manner.

BACKGROUND

Viscometers, which allow measurement of viscosity, play an important role in scientific and industrial applications. However, the advancements in scientific research and industrial applications now demand viscometers that are more rapid and accurate than conventional viscometers.

SUMMARY

Various shortcomings of conventional viscometers are addressed by the viscometers described herein. For example, conventional viscometers require cleaning of the parts in contact with liquid (container, spindle, and so on) before the next measurement. However, dead volumes in the conventional viscometers reduce accuracy in viscosity measurements and make cleaning more difficult and time consuming. As a result, it is difficult to make continuous viscosity measurement with a viscometer including a dead volume without loss of accuracy.

As described herein, a proper and carefully designed packaging of a slit viscosity sensor chip and a precision liquid dispensing system with a novel valve manifold with minimum dead volume allows viscosity measurement in a semi-continuous manner with fast response and less cleaning time with high accuracy. Such viscometer coupled with a precision liquid dispensing system may measure viscosity of a liquid in a semi-continuous manner. The viscometer may be equipped with a display to show test results and viscosity. In some embodiments, the dispensing system includes a precision pump, a valve manifold, and a precisely packaged viscosity sensor chip.

In accordance with some embodiments, a semi-continuous viscosity measurement instrument includes a miniature viscosity sensor chip, a positive displacement pump, valves, and a control and display. The miniature viscosity sensor chip includes a micron scale flow channel combined with a monolithic pressure sensor array which measures a pressure drop of a fully developed flow in the flow channel while the pressure sensor array sensing surface forms one side of the flow channel. The sensor chip as well as the flow paths contacting liquids are packaged with no dead volume. The positive displacement pump and the valves are designed and configured in ways that no dead volume is in the flow path. The sensor chip measures a shear stress. The shear rate is controlled by the pump and proportional to the generated flow rate. Viscosity of the test liquid is calculated by dividing the shear stress by the shear rate. The test result is shown in the touch screen display.

In accordance with some embodiments, a viscometer includes a viscosity sensor with a liquid flow channel for measuring a viscosity of a liquid flowing through the liquid flow channel, a manifold (e.g., a zero-dead-volume manifold) with an inlet and an outlet for receiving a liquid sample through the inlet of the manifold and providing the received liquid sample through the outlet of the manifold to the viscosity sensor, and a pump coupled with the manifold for causing an in-flow of the liquid sample into the manifold through the inlet of the manifold and an out-flow of the received liquid sample from the manifold through the outlet of the manifold.

In addition, conventional viscometers have a limited dynamic range. As a result, if one needs to characterize the viscosity as a function of shear rate over wide shear rate range, frequently multiple viscosity sensor chips with different dynamic ranges are used due to the limited dynamic range of each sensor chip.

As described herein, a viscosity sensor chip (or a viscosity sensor module) described herein has an increased dynamic range. This allows viscosity measurement as a function of shear rate beyond the limitations of conventional viscometers.

In accordance with some embodiments, a viscosity sensor chip increases the dynamic range of shear rates and throughput of measurement. The sensor chip includes a flow cell and multiple monolithic pressure sensor array combined. The flow cell includes separate flow channels with different depths and separate inlet and outlets. Each monolithic pressure sensor array has a unique full-scale pressure. The channel depths of the flow channels are determined in relationship to the full-scale pressure of each pressure sensor arrays. Using the viscosity sensor chip, viscosities can be measured at different shear rates simultaneously with a minor increase in the sample volume requirement. In some embodiments, the viscosity sensor chip is used to characterizes the interaction between proteins and proteins in a formulation.

In accordance with some embodiments, a viscosity sensor module includes a first viscosity sensor with a first liquid flow channel for measuring a viscosity of a liquid flowing through the first liquid flow channel, and a second viscosity sensor with a second liquid flow channel for measuring a viscosity of a liquid flowing through the second liquid flow channel.

In accordance with some embodiments, a method includes, with a viscometer including any viscosity sensor module described herein, measuring viscosity values of a liquid containing protein molecules at a plurality of shear rates, and determining a size of aggregates from the measured viscosity values for analyzing an interaction of the protein molecules in the liquid.

The disclosed devices and methods allow viscosity measurements with improved accuracy, speed, and dynamic range.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 2A and 2B are schematic diagrams illustrating operations of a zero dead volume valve manifold in accordance with some embodiments.

FIGS. 7A and 7B are schematic diagrams illustrating viscometers capable of taking sample and measuring viscosity semi-continuously in accordance with some embodiments.

DETAILED DESCRIPTION

Reference will be made to embodiments, examples of which are illustrated in the accompanying drawings. In the following description, numerous specific details are set forth in order to provide a thorough understanding of the various described embodiments. However, it will be apparent to one of ordinary skill in the art that the various described embodiments may be practiced without these particular details. In other instances, methods, procedures, components, circuits, and networks that are well-known to those of ordinary skill in the art are not described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first valve could be termed a second valve, and, similarly, a second valve could be termed a first valve, without departing from the scope of the various described embodiments. The first valve and the second valve are both valves, but they are not the same valve.

The terminology used in the description of the embodiments herein is for the purpose of describing particular embodiments only and is not intended to be limiting of the scope of claims. As used in the description and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Viscometer with Valve Manifold with Reduced Dead Volume

As explained above, dead volumes in the conventional viscometers reduce accuracy in viscosity measurements and make cleaning more difficult and time consuming. Described herein is a viscometer with a valve manifold, which reduces the dead volume. Although in some configurations, such valve manifold may have no (i.e., zero) dead volume, in some other cases, such valve manifold may still have some dead volume, although the dead volume of such valve manifold is less than the dead volume found in conventional viscometers. A zero-dead-volume valve manifold (having zero dead volume) is used as an example, a valve manifold having some (albeit reduced) dead volume may be used in some embodiments.

Figure 1:
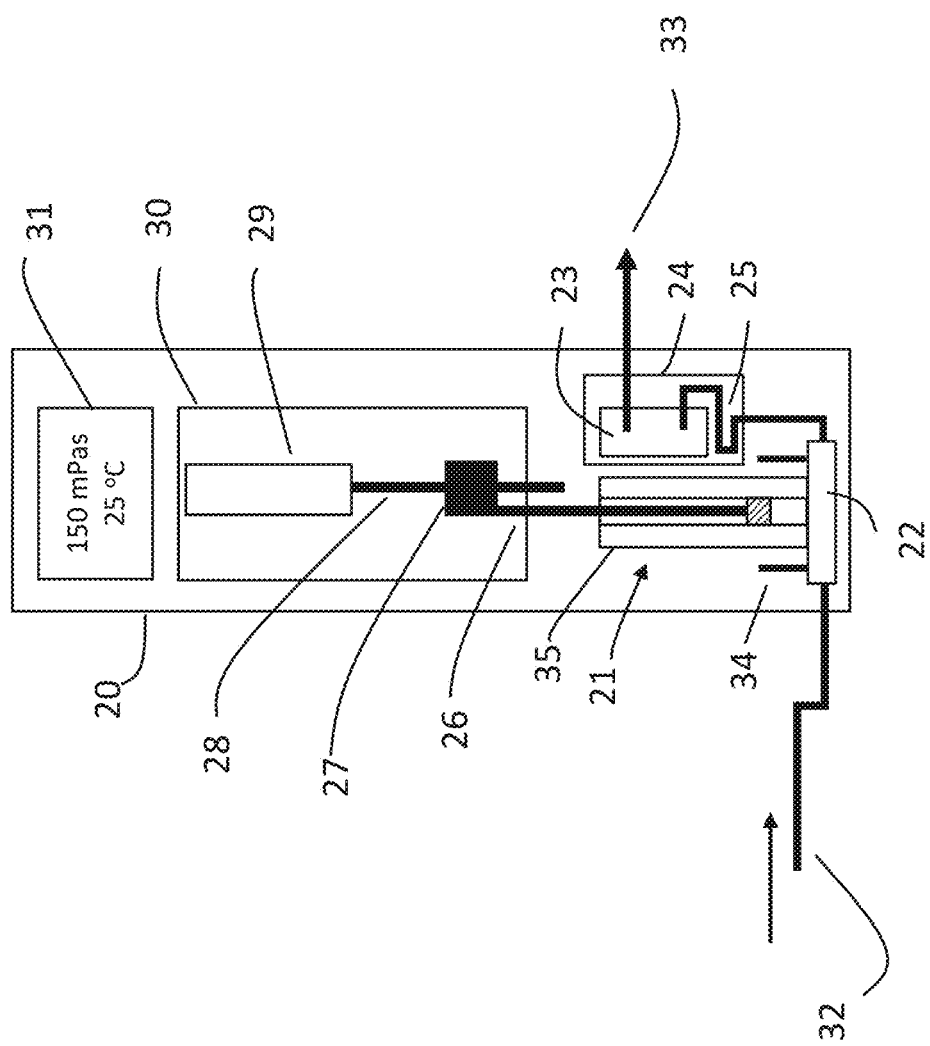
FIG. 1 is a schematic diagram illustrating a viscometer that measures viscosity in a semi-continuous manner in accordance with some embodiments.

An example a viscometer (20) which measures viscosity in a semi-continuous manner as shown in FIG. 1. In FIG. 1, the viscometer includes a liquid dispensing system (21), a flow-through zero-dead volume viscosity sensor chip (23), a control (30), and a display (31).

In some embodiments, the liquid dispensing system (21) further includes a positive displacement syringe barrel (35), a plunger (26), a coupling nut (27) which couples the plunger (26) with the lead screw (28), and a zero-dead-volume valve manifold (22). The lead screw (28) is further coupled with a motor (29).

In some embodiments, the control (30) includes a microcontroller or microprocessor and other electronics that drive, process and control the flow of liquid from the source (32) through viscosity sensor chip (23), display (31), the liquid dispensing system (21).

In some embodiments, the liquid dispensing system (21) outputs (33) the liquid (e.g., to a disposal bin).

Figure 2B:
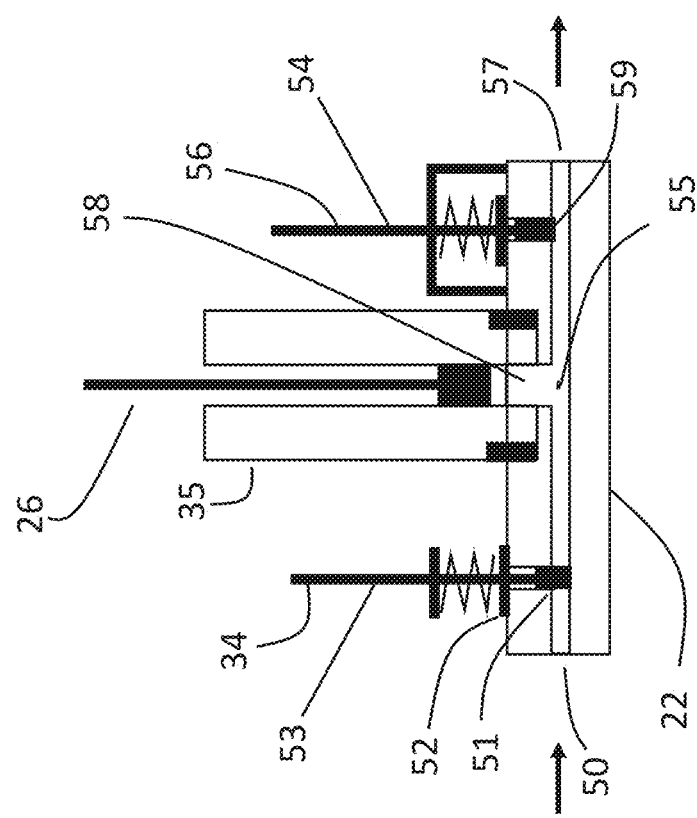

As shown in FIGS. 2A and 2B, in some embodiments, the zero-dead-volume valve manifold (22) includes the valves (34, 56), a liquid path that connects the inlet (50), the syringe barrel (35) and the outlet (57) and the valve holes where valve seals (51, 59) coupled with respective shafts (53, 54) move up and down or open or close (e.g., a corresponding portion of the liquid path) to control the liquid flow. In some embodiments, the holes for the valve seals are made to be comparable in size with the diameter of the flow inlet (50) so that there is no dead volume. As used herein, the dead volume is defined as a volume of the zone in which direct flow is not accessible in flow path. For example, in some embodiments, the diameter of the hole (58) is made to be exactly the same as the diameter of the plunger. In some configurations, this allows the plunger to move further down to the flow path (55) past the barrel (35). In these configurations, a dead volume can be eliminated. Because dead volume is a source of long residence of a sample, which makes cleaning more difficult and becomes source of inaccuracy, elimination or reduction of the dead volume facilitates cleaning and improves measurement accuracy. As the plunger is withdrawn while the valve (34) is open and another valve (56) is closed, a test sample flows in from the inlet (50) to inside of the syringe barrel (35). Once the syringe barrel (35) is filled with a test sample, the valve (34)

is closed and the valve (56) is open. Under this configuration, as the plunger (26) moves forward, a test sample flows out through the outlet (57). In some embodiments, the test sample flowing out through the outlet (57) enters the viscosity sensor chip (23).

In some embodiments, the viscosity sensor chip measures shear stress. Flow rate of the test sample and thus the shear rate can be changed by varying the speed of the plunger (26). With measurement at various shear rates, true viscosity can be measured for non-Newtonian liquids. Thus, in some embodiments, the viscometer (20) moves the plunger (26) at two or more speeds (e.g., moving, for a given test liquid, the plunger (26) at a first speed at a first time, at a second speed that is distinct from the first speed at a second time that is distinct from the first time, and at a third speed that is distinct from the first speed and the second speed at a third time that is distinct from the first time and the second time). The viscometer (20) determines a true viscosity of a test liquid based on viscosity values measured at the two or more speeds of the plunger (26).

In some embodiments, a sample precondition chip (25) is added just before the entrance of the viscosity sensor chip (23). This allows pre-conditioning the sample to a particular test temperature before the sample enters the chip. The pre-conditioning of the sample (to the particular test temperature) reduces variation in the viscosity measurements by enabling measurements at the particular test temperature. In some embodiments, the precondition chip (25) is used to change the temperature of the sample to two or more temperatures (e.g., to a first temperature at a first time and to a second temperature that is distinct from the first temperature at a second time that is distinct from the first time). In some cases, this allows measurement of viscosity values at the two or more temperatures. In some embodiments, the temperature of the sample preconditioning chip and the viscosity sensor chip is controlled with a Peltier module or heating elements (24).

The internal volume of the sample precondition chip is tailored so that a sample can reach the desired temperature before entering the viscosity sensor chip (23).

As described above, FIGS. 2A and 2B illustrate the structure and operations a valve manifold in accordance with some embodiments. In some embodiments, multiple viscosity sensor chips (23) with different shear rate ranges or viscosity ranges are mounted to the viscometer (20). When multiple chips are connected in parallel, a large number of valves (56) are needed to control the distribution of the sample to the multiple viscosity sensor chips (23). In some embodiments, the open and close actions of the valves (34, 56) are driven by an electromagnetic force (e.g., with solenoid vales) or by linear actuators.

Figure 3A:
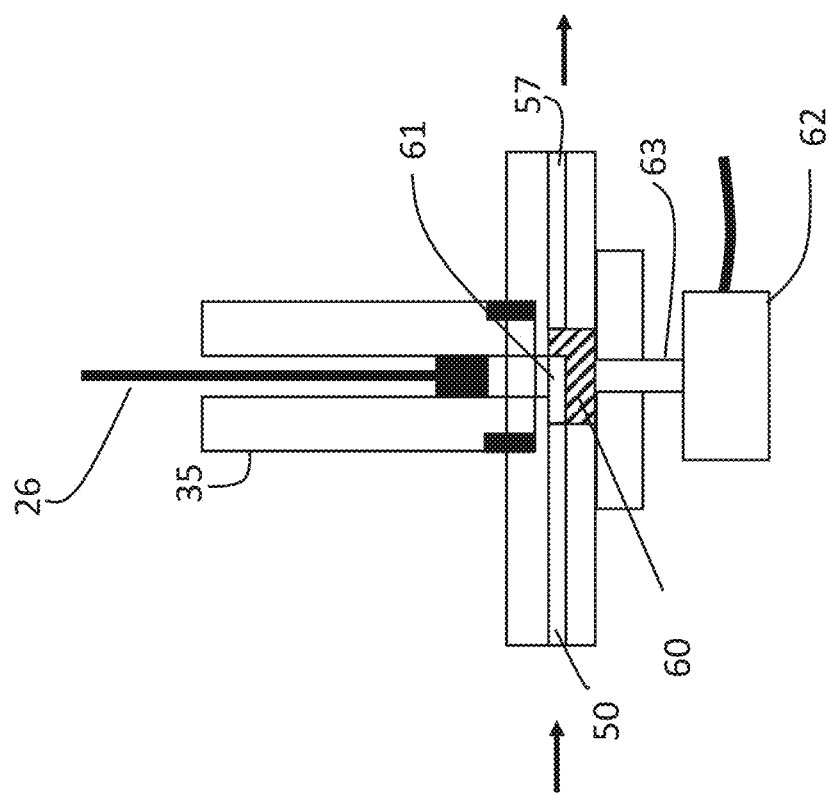
FIGS. 3A and 3B are schematic diagrams illustrating operations of another zero dead volume valve manifold in accordance with some embodiments.
Figure 3B:
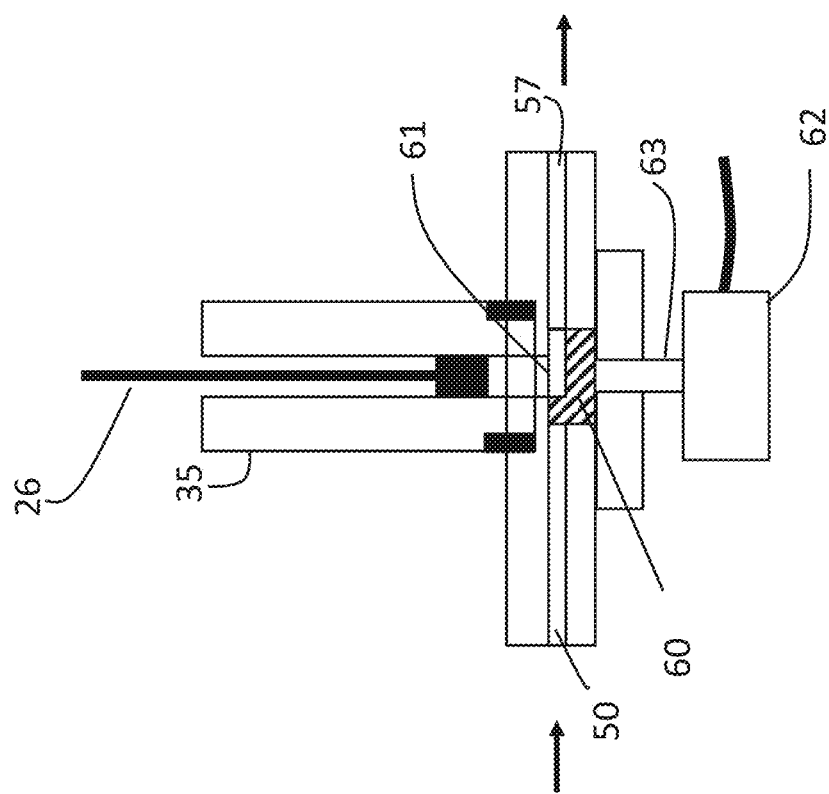

FIGS. 3A and 3B illustrate the structure and operations a valve manifold in accordance with some other embodiments. In FIGS. 3A and 3B, instead of using independent valves (e.g., valves 34 and 56 shown in FIGS. 2A and 2B), a single rotation of a valve plug (60) selectively connects flow paths. For example, when the plunger (26) is withdrawn while the valve plug (60) is in a first orientation (e.g., shown in FIG. 3A), a test sample flows in from the inlet (50) to inside of the syringe barrel (35). Once the syringe barrel (35) is filled with a test sample, the valve plug (60) is put (e.g., rotated) into a second orientation (e.g., shown in FIG. 3B). Under this configuration, as the plunger (26) moves forward (e.g., downward), a test sample flows out through the outlet (57). In some embodiments, the test sample flowing out through the outlet (57) enters the viscosity sensor chip (23).

In some embodiments, the valve plug (60) is designed so that there is no dead volume in the connection (61). In some embodiments, the valve plug (60) is coupled to a motor (62) (e.g., via a valve stem (63)). This allows the valve plug (60) to rotate as the motor (62) rotates the valve stem (63).

Figure 4A:
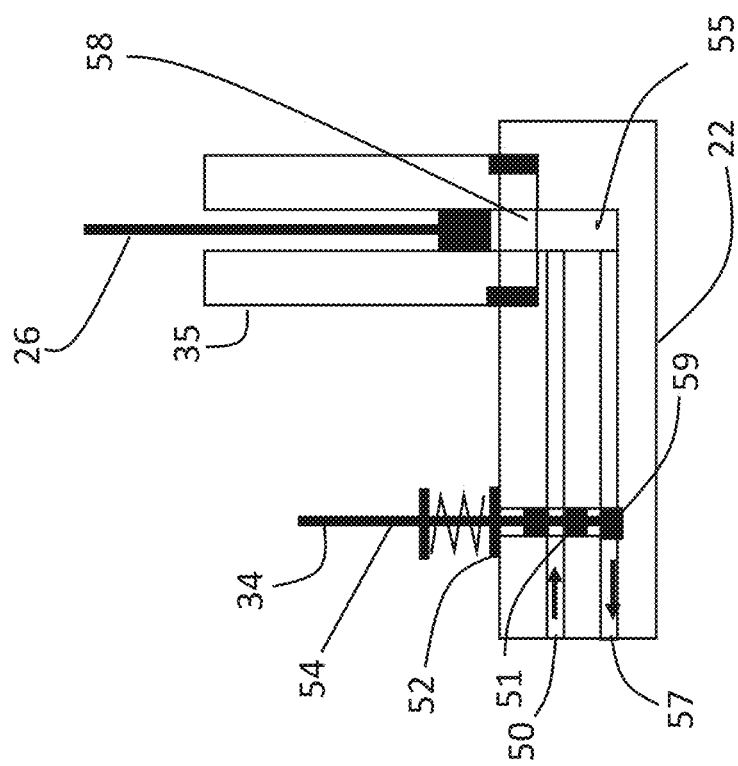
FIGS. 4A and 4B are schematic diagrams illustrating operations of yet another zero dead volume valve manifold in accordance with some embodiments.
Figure 4B:
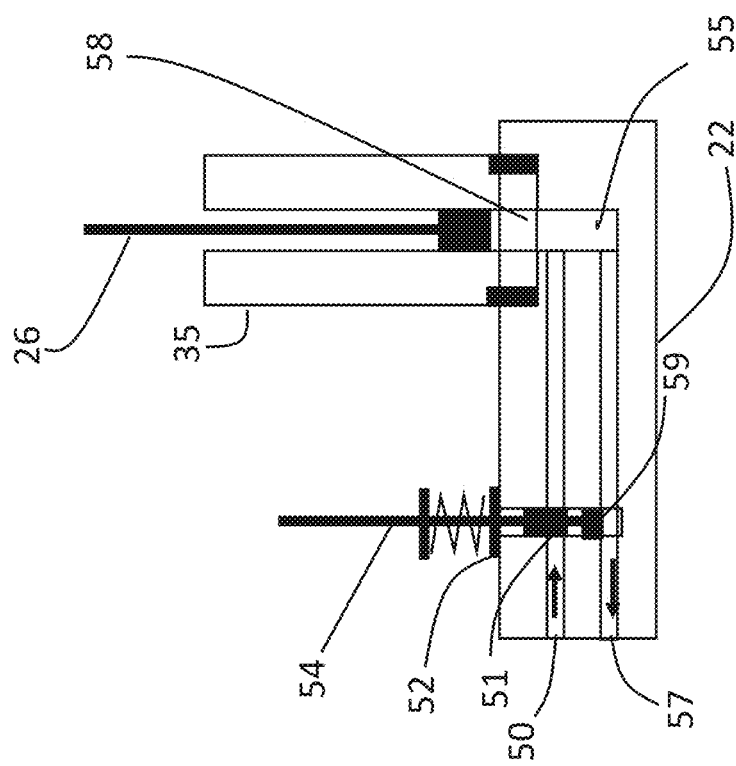

FIGS. 4A and 4B illustrate the structure and operations of a valve manifold in accordance with yet some other embodiments. The valve manifold shown in FIGS. 4A and 4B are similar to the valve manifold shown in FIGS. 2A and 2B, except that the valves 34 and 56 are integrated in the valve manifold shown in FIGS. 4A and 4B. In FIGS. 4A and 4B, the valve seals 51 and 59 are coupled to a same (e.g., single) shaft 54 so that the seal 51 moves concurrently with the seal 59. In some embodiments, the seal 51 is positioned relative to the seal 59 (e.g., the valve seals 51 and 59 are separated from each other on the shaft 54) so that while the seal 51 opens the inlet 50, the seal 59 closes the outlet 57 (as shown in FIG. 4A), and while the seal 51 closes the inlet 50 (e.g., by moving the shaft 34 coupled with the valve seals 51 and 59), the seal 59 opens the outlet 57 (as shown in FIG. 4B). Thus, when the plunger (26) is withdrawn while the shaft 54 is at a first position so that the seal 51 opens the inlet 50 and the seal 59 closes the outlet 57 (e.g., shown in FIG. 4A), a test sample flows in from the inlet (50) to inside of the syringe barrel (35). Once the syringe barrel (35) is filled with a test sample, the shaft 54 is moved to a second position so that the seal 51 closes the inlet 50 and the seal 59 opens the outlet 57 (e.g., shown in FIG. 4B). Under this configuration, as the plunger (26) moves forward (e.g., downward), a test sample flows out through the outlet (57). In some embodiments, the test sample flowing out through the outlet (57) enters the viscosity sensor chip (23).

Figure 5:
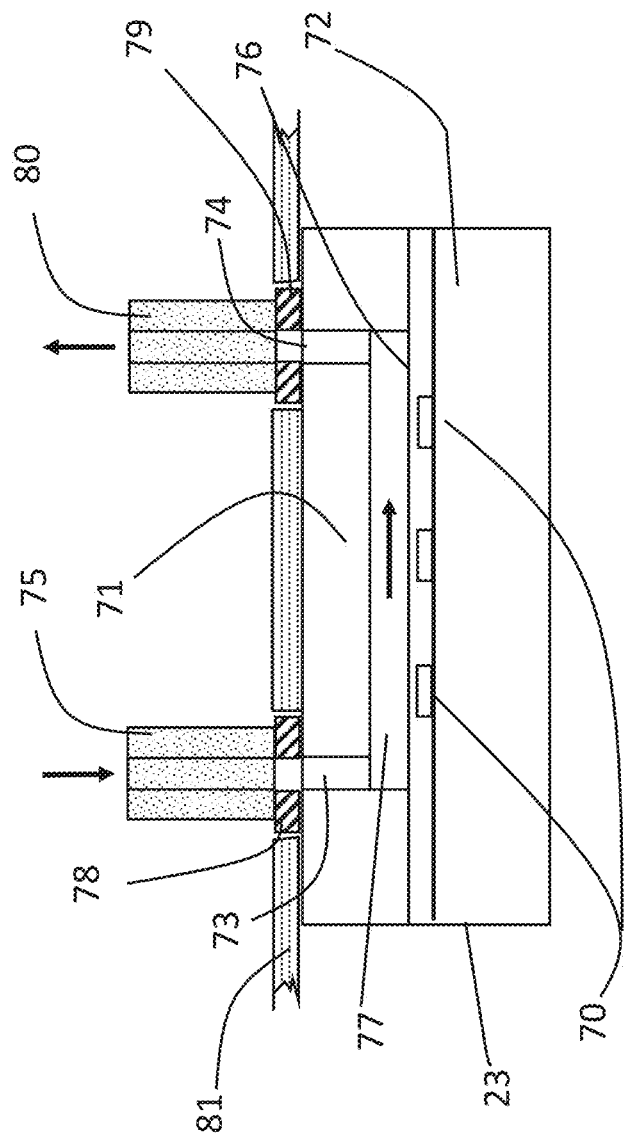
FIG. 5 is a schematic diagram illustrating a zero dead volume package of a viscosity sensor chip in accordance with some embodiments.

FIG. 5 is a schematic diagram illustrating a zero dead volume package of a viscosity sensor chip in accordance with some embodiments. Certain aspects of the viscosity sensor chip are described in U.S. Pat. Nos. 6,892,583 and 7,290,441, both of which are incorporated by reference herein in their entireties, and thus, are not repeated herein for brevity.

As a test sample enters the viscosity sensor chip (23), it enters an inlet fluidic adaptor (75), inlet (73), a flow channel (77), outlet (74), and the outlet fluidic adaptor (80). In some embodiments, the flow channel (77) includes (or is defined by) a substrate (71) (e.g., glass, such as borosilicate glass). In some embodiments, the substrate (71) forms three walls of the flow path (77) and the sensor array surface (76) which forms the fourth wall of the flow path (77). Due to the viscosity, there would be a pressure gradient along the flow path and the local pressures are detected by the monolithic pressure sensors (70). In some embodiments, the monolithic pressure sensors (70) are located on a second substrate (72) (e.g., a silicon or borosilicate substrate).

In some embodiments, gaskets (78, 79) are inserted between the inlet fluidic adaptor (75) and the substrate (71) and between the outlet fluidic adaptor (80) and the substrate (71). This facilitates reducing or eliminating the dead volume. In some embodiments, inside diameters of the gaskets (78, 79) are made to be substantially the same as those of inlet (73) and outlet (74) as shown in FIG. 5. This further facilitates reducing or eliminating the dead volume. In some embodiments, the inside diameters of the gaskets (78, 79) are selected, accommodating the changes of inside diameter upon compression of the gasket (e.g., the inside diameters of the gaskets (78, 79) may not match the inside diameters of the inlet (73) and the outlet (74) when they are not compressed but match the inside diameters of the inlet (73) and the outlet (74) when they are compressed). In some embodiments, the viscosity sensor chip (23) includes fixture (81) for retaining the gaskets (78, 79) in respective locations. In some other embodiments, the gaskets (78, 79) are integral parts of the inlet and outlet fluidic adaptors (75, 80).

Figure 6:
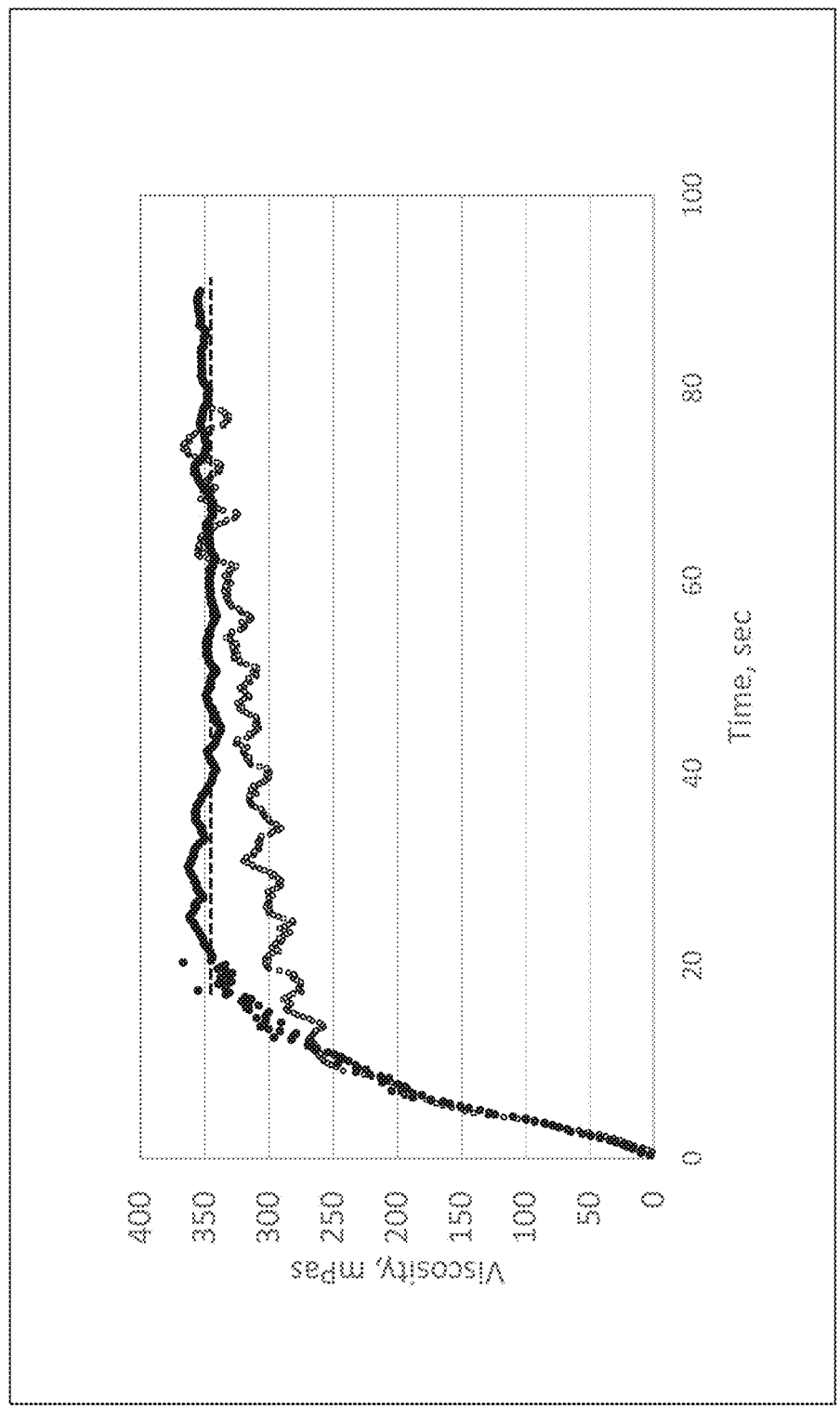
FIG. 6 shows viscosity measurement responses depending on a dead volume of the package.

Elimination of the dead volume is extremely important in order to ensure an accurate viscosity measurement and to prevent accumulation of aged samples over a period of time. FIG. 6 shows time evolution of the viscosity of a sample of 93% glycerol in water solution at ambient condition as measured with the two viscosity sensor chips (23). The viscosity sensor chips (23) were packaged so that one chip does not have a dead volume and another with ~0.5 mL more dead volume in the inlet (73) of the flow channel (77). The viscosity sensor chips were filled with isopropyl alcohol prior to the viscosity measurement of the glycerol sample at 9 mL/min so that the same initial condition was established. As shown in FIG. 6, the viscosity sensor chip (23) packaged with zero dead volume (large dots) reaches the steady state value much quicker compared to another viscosity sensor chip with slightly more dead volume (small dots). The dead volume delays (e.g., 20 seconds vs. 80 seconds) the replacement of the isopropyl alcohol with the 93% glycerol in water solution resulting in increased inaccuracy and uncertainty and requires more sample volume to reach the steady state for accurate measurement. Therefore, elimination of the dead volume with the current package is extremely important for accurate and fast viscosity measurement when the viscosity of one sample is measured after another sample in a semi-continuous manner.

FIG. 7A illustrates a viscometer in accordance with some embodiments. A motorized dispenser (87) includes a motor (92), a lead screw (99), coupling nut (90), a rod (88) which is coupled with a plunger (84) of a pipette with a coupler (86). In some embodiments, a tip (83) of the pipette (82) is coupled to the dispenser (87) with an adaptor (85). This allows the plunger (84) to move freely while the pipette tip (83) is secured in position. The pipette (82) includes a plunger (84). In some embodiments, the tip (83) is disposable so that it can be replaced with a new tip after each sample is tested. After a first sample is loaded into the pipette (82) by retrieving the rod (88), the pipette (82) is mounted to the base (98) where the end (89) of the pipette tip (83) is secured to the viscosity sensor chip (94) through the inlet (95). In some embodiments, the dispenser (87) is locked in position through the locking action between grooves (91) and a key (96). Supports (97) of the base (98) ensures that the viscometer is either horizontal or vertical. As the rod (88) moves forward (e.g., downward), the first test sample is injected to the viscosity sensor chip (94) and the viscosity of the first test sample is measured. After the first sample is tested (e.g., the viscosity of the first test sample is measured), the dispenser (87) is detached from the base (98) by releasing the key (96). In some embodiments, a new pipette tip (83) is mounted in place (e.g., after releasing a previous pipette tip (83)). Then a second test sample is loaded into the pipette tip (83). Then the steps above may be repeated to measure the viscosity of the second test sample. In this way, viscosity of a system can be monitored in a semi-continuous manner.

Figure 7B:
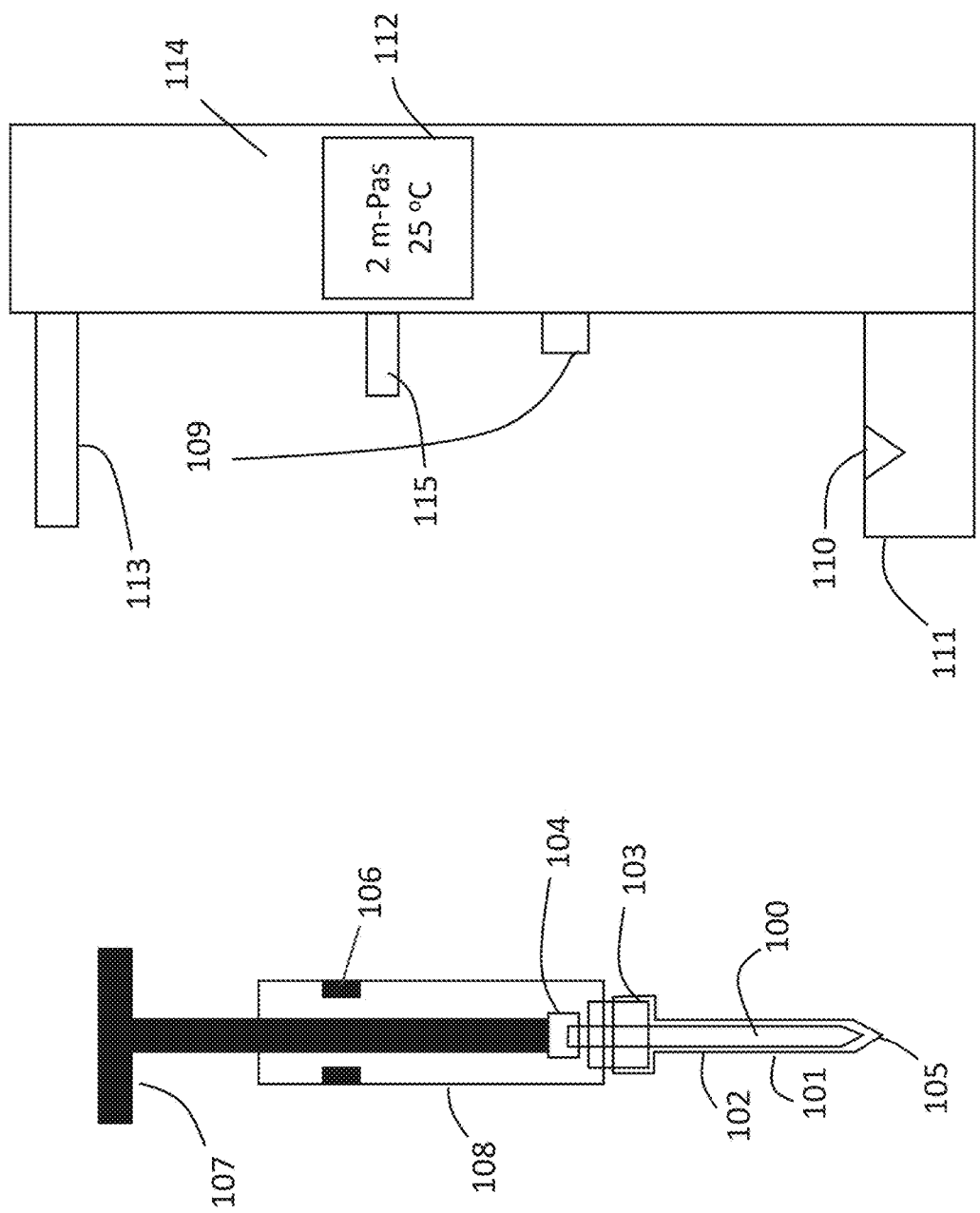

FIG. 7B illustrates a viscometer in accordance with some embodiments. In FIG. 7B, the dispenser (101) is mounted to a hand-held pipette holder (108) through adaptors (103, 104). As the plunger (107) is pulled (e.g., manually), a sample is withdrawn into a pipette tip (102) of a pipette (100). The sample loaded dispenser (101) is mounted to a measurement unit (114) where a viscosity sensor chip (111), control, and display (112) are located. In some embodiments, the measurement unit (114) a key (115) for a locking mechanism with a groove (106). An end (105) of the pipette tip (102) is connected to the inlet of the chip (110). For the measurement, a pusher block (113) pushes the plunger (107) at a controlled speed. For example, the controlled speed may be programed on a display (112) (e.g., a touch screen display). In some embodiments, as the sample flows into the viscosity sensor chip (111), a viscosity value is reported and displayed on the display (112).

Enhanced Viscosity Sensor Module

In accordance with some embodiments, an enhanced viscosity measurement sensor chip (or a viscosity sensor module) that measures viscosities at multiple shear rates simultaneously can increase the throughput and dynamic range of a viscometer.

Figure 8:
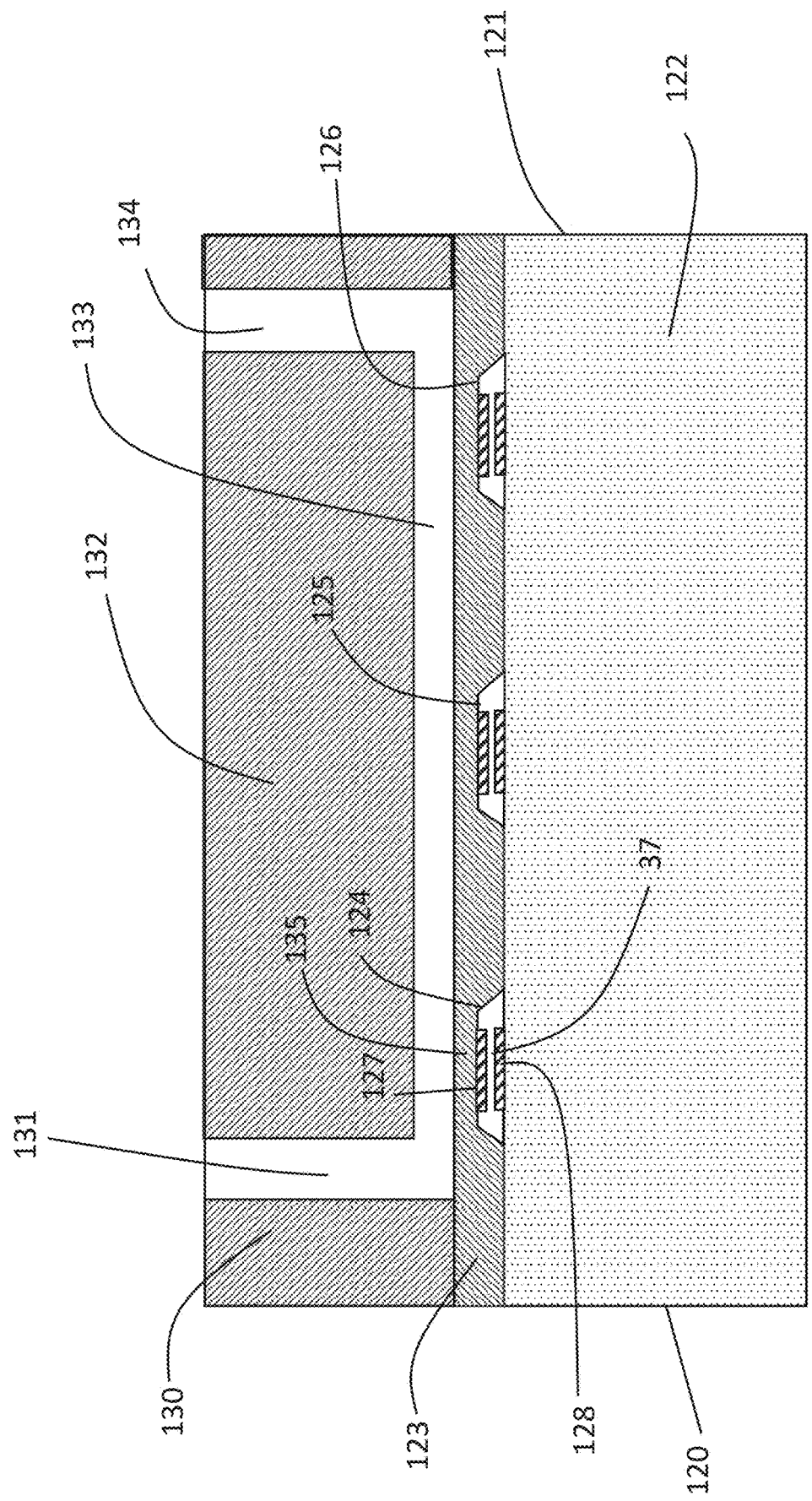
FIG. 8 is a schematic diagram illustrating a monolithic pressure sensor array in prior art.

FIG. 8 describes a viscosity sensor chip (120). The viscosity sensor chip (120) includes a flow cell (130) and the viscosity sensor chip (121). In some embodiments, the viscosity sensor chip includes a substrate (122) (e.g., borosilicate glass substrate) and a substrate (123) in which cavities (124, 125, 126) are defined. In some embodiments, each cavity (124, 125, 126) is coupled with electrodes (127, 128), which form a capacitor (or a capacitive pressure sensor). The flow cell (130) includes a flow channel (133), inlet (131) and outlet (134). In some embodiments, the flow channel (133), the inlet (131), and the outlet (134) are built into (e.g., defined in) a substrate (132) (e.g., borosilicate glass substrate). In some embodiments, the flow channel (133) is uniform in depth (or thickness). As a test sample enters the flow channel (133) through the inlet (131), an internal pressure increases and deflects a membrane (135) (e.g., a silicon membrane) over the cavity (e.g., 124, 125, and/or 126). The deflection of the membrane increases a capacitance between the two electrodes (127, 128), which is measured electronically. In some embodiments, the cavities near the inlet and outlet are positioned sufficiently away from the inlet and outlet in order to measure pressure of a fully developed flow. In some embodiments, the surface of the substrate (123) (e.g., a silicon substrate) forms a side of the flow channel (133). In some embodiments, the surface of the substrate (123) forming the side of the flow channel (133) is a smooth surface. In some embodiments, cavities (124, 125, and 126) are connected to an ambient condition (e.g., ambience, which is not shown) so that the pressure sensor measures a gauge pressure (e.g., a pressure differential over the atmospheric or ambience pressure). In some cases, in order to measure pressure accurately, the viscosity sensor chip (120) is calibrated by applying a known and controlled gauge pressure to one of the inlet (131) or the outlet (134) while another port (e.g., the other of the inlet (131) or the outlet (134)) is closed. In some embodiments, the viscosity sensor chip (120) measures viscosity at a shear rate at a given flow rate. This is facilitated by having a uniform depth of the flow channel (133).

Each pressure sensor has a limit in measurable range in pressure. In some embodiments, its upper measurable pressure is limited by the thickness of the membrane (135) and the gap (37) between electrodes (127, 128). The pressure sensor can no longer measure pressure accurately or reliably when the gap (37) is zero. The upper measurable pressure is called the full-scale pressure. A lower limit of the pressure sensor is determined by a signal-to-noise ratio. In some configurations, the signal-to-noise ratio is related to the full-scale pressure set by the measurement electrical components. In configurations in which the cavity depth of each pressure sensor (124, 125, 126) is uniform, the full-scale pressure of each pressure sensors in a viscosity sensor chip (120) are the same. Because the full-scale pressure and the flow channel depth are the same with each viscosity sensor chip (120), a measurable dynamic range of shear rate and viscosity is limited. For this reason, in some embodiments, multiple viscosity sensor chips are often used to fully characterize liquids such as non-Newtonian liquids for which viscosity varies with shear rate. However, the use of multiple chips requires laborious chip exchange and a larger volume of sample.

Figure 9:
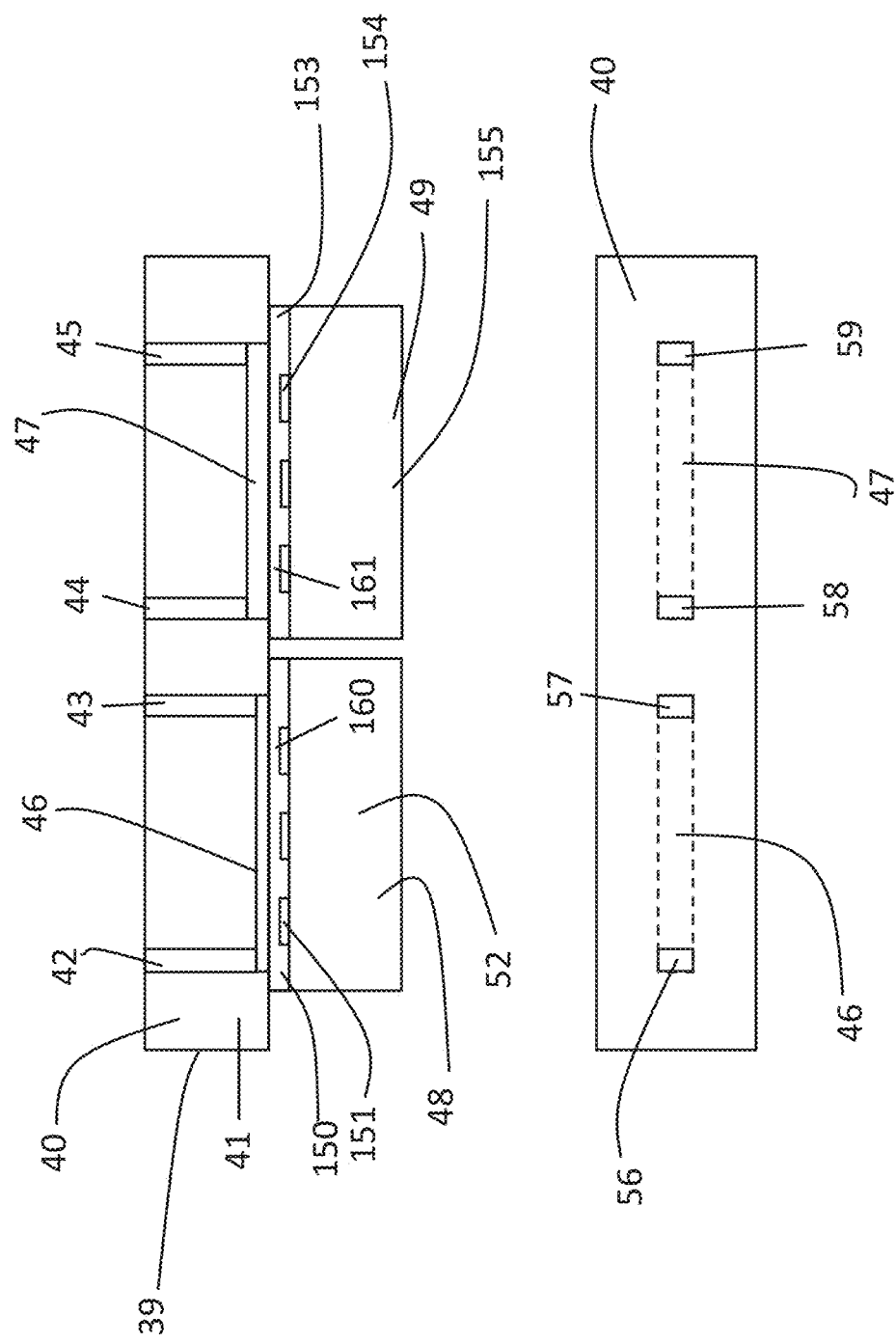
FIG. 9 is a schematic diagram illustrating a flow cell with multiple flow channel with different depth and multiple pressure sensor array with different full-scale pressures in accordance with some embodiments.

FIG. 9 illustrates a viscosity sensor module (39) with an extended dynamic range. Such viscosity sensor chip can be used to overcome the shortcomings of prior viscosity measurement methods. For example, such viscosity sensor chip may be configured to require only a limited volume (e.g., a few microliters) of an additional sample. The viscosity sensor module (39) includes a single flow cell (40) and multiple viscosity sensor chips (48, 49). The flow cell (40) includes an inlet (42), a flow channel (46), outlet (43), inlet (44), another flow channel (47), and outlet (45) fabricated in the same substrate (41) (e.g., borosilicate glass substrate). The flow cell (40) is bonded with a first viscosity sensor chip (48) and a second viscosity sensor chip (49). The first viscosity sensor chip (48) includes a substrate (52) (e.g., borosilicate glass substrate) and a substrate (150) (e.g., a bonded silicon substrate) forming multiple pressure sensors (151) with a membrane (160) having a uniform thickness. The second viscosity sensor chip (49) includes the substrate (155) (e.g., borosilicate glass substrate) and a substrate (153) (e.g., bonded silicon substrate) forming multiple pressure sensors (154) with a membrane (161) having a uniform thickness. In some embodiments, the full-scale pressures of pressure sensors (151, 154) and the depths of the flow channels (46, 47) are designed to follow the relationship:

$$\frac{P_1}{P_2} \sim \frac{w_2 h_2^3}{w_1 h_1^3}$$

where $P_1$ is the full-scale pressure of viscosity sensor chip (48), $P_2$ is the full-scale pressure of the viscosity sensor chip (49), $w_1$ and $h_1$ are the width and depth of the flow channel (46), and $w_2$ and $h_2$ are the width and depth of the flow channel (47). For example, if $P_1$ and $P_2$ are 1.8 M Pa and 0.04 M Pa, we obtain the ratio of $h_2$ and $h_1$ as follows:

$$\frac{h_2}{h_1} \sim 3.55.$$

For example, if upstream flow channel depth $h_1$ is 20 µm, then the downstream flow channel $h_2$ is 71 µm. Since the flow channel depth $h_2$ is different from $h_1$, a test sample is subject to different shear rates in the flow channels (46, 47) for a given flow rate as shown by the equation:

$$\dot{\gamma} = \frac{6Q}{wh^2}$$

where $\dot{\gamma}$ is the shear rate, Q the flow rate, w the width of the flow channel and h the flow channel depth. A test sample enters inlet (42) and exits the outlet (43). The exiting liquid enters the inlet (44) connected fluidically outside of the flow cell (40) and leaves the outlet (45). When a test sample enters the viscosity sensor module (39), then two viscosities are measured at two shear rates simultaneously. Thus, such configurations allow increasing the dynamic range in measuring the viscosity values. In some embodiments, the dimensions of the inlets (42, 44) and outlets (43, 45) are selected so that pressure drops within the inlets and outlets are negligible compared to those in the flow channels (46, 47). Typically, they range from 200 to 1,000 µm in characteristic dimension.

For viscosity measurement, the outlet (43) and the inlet (44) are connected externally for a sample to flow from the outlet (43) to the inlet (44). However, for the calibration of the pressure sensors the ends of the outlet (43) and inlet (44) are closed. Pressure is applied to the inlet (42) to calibrate the pressure sensors of the viscosity sensor chip (48) and pressure is separately applied to the outlet (45) to calibrate the viscosity sensor chip (49). In this way, pressure sensors with significantly different full-scale pressures can be calibrated without damaging the sensor with low full-scale pressure (e.g., pressure sensors in the viscosity sensor chip (49).

Figure 10:
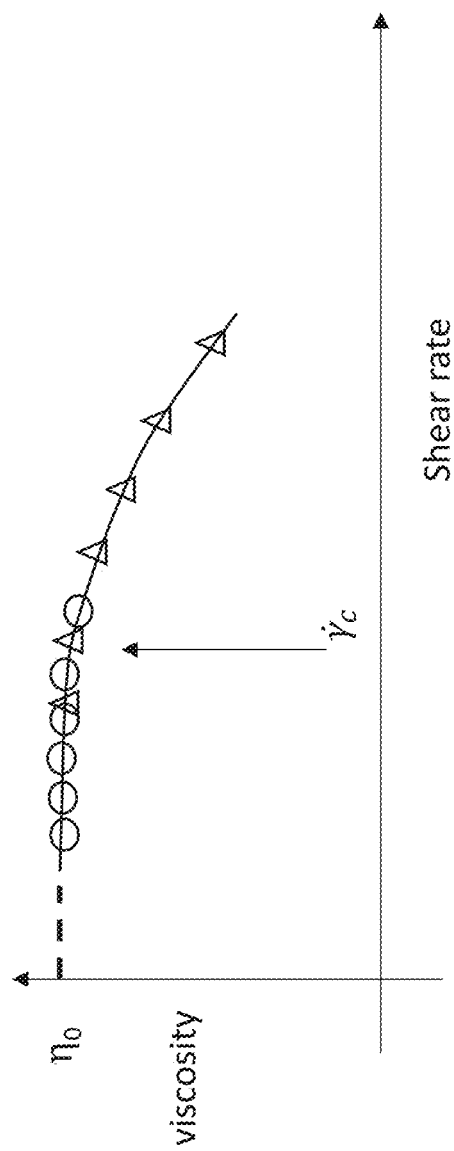
FIG. 10 shows an analysis of the viscosity vs. shear rate for the size of protein particles and interaction.

FIG. 10 shows an example of viscosity as a function of shear rate for a non-Newtonian shear thinning liquid. A sample entering the viscosity sensor module (39) is sheared at two discrete shear rates for a given flow rate in each flow channel. Thus, two viscosities at two different shear rates are measured simultaneously. As the flow rate is changed, the two discrete shear rates are also changed so that viscosities at additional shear rates are measured in a faster manner.

As shown in FIG. 10, in some cases, there is an overlap in shear rate rages measured in each flow channel. For example, the lowest shear rate measured in the upstream narrower flow channel is lower than the highest shear rate measured in the downstream deeper flow channel as shown in FIG. 10. This facilitates combining the viscosity values measured from the two flow channels. In order to meet this requirement, in some embodiments, additional criterion is used for the ratio of the flow channel depths of the flow channels as shown below:

$$\frac{h_2}{h_1} < \sqrt{\frac{100\% \text{ of } P1}{\% \text{ full scale of } P1}}$$

where $P_1$ is the full-scale pressure of the viscosity sensor chip (48) and the % of the full-scale of $P_1$ is a percentage of the full-scale pressure of $P_1$ at the shear rate in the viscosity sensor chip (48), which is smaller than the highest shear rate measured at the viscosity sensor chip (49). If the % of the full-scale of $P_1$ is 8%, then the shear rate measured at 8% of full-scale in the viscosity sensor chip (48) is smaller than the highest shear rate measured in the viscosity sensor chip (49). The ratio inequality results into $$\frac{h_2}{h_1} < 3.53.$$

If the desired % of full-scale is 10%, then value in the right-hand side of the inequality becomes 3.16. In some embodiments, the viscosity sensor chip (49) satisfies the two relations.

Such viscometers with a large dynamic range are especially useful in characterizing the interaction of proteins in a solution. Protein molecules are suspended like colloidal particles in aqueous solutions. Depending on their molecular interactions, protein molecules can form associates or clusters or exist as separate molecules. When the clusters are formed, the characteristic size of the cluster is larger than that of a molecule. The size of the cluster can be probed or determined from viscosity values as a function of a shear rate. At low shear rates, the clusters in the solution are not much disturbed by the shear rate and interactions between the clusters deviate slightly from the thermal equilibrium state. As the shear rate is increased, a shear flow starts dominating over the thermal equilibrium of the clusters and the viscosity begins to decrease with the shear rate. The shear thinning behavior can be characterized with the Peclet number, which is defined as:

$$Pe = \frac{6\pi\eta_0\dot{\gamma}_c L^3}{kT}$$

The transition from the constant viscosity to viscosity decrease takes place when Pe~1. $\eta_0$ is the constant viscosity, L is the characteristic length of the cluster, and $\dot{\gamma}_c$ is the critical shear rate when the viscosity starts decreasing as shown in FIG. 10. As the cluster become larger, L increases. When the cluster is close to individual molecule, L is close to the radius of the individual protein molecule. Since the cluster size is expected to increase with the increased attractive interaction of the molecules, the cluster size L characterizes, or indicates, the interaction between molecules.

Measuring interaction between molecules is important when a protein therapeutic formulation is developed. The viscosity sensor chip allows the measurement of the interaction of protein molecules in a rapid manner for a small sample volume.

Figure 11:
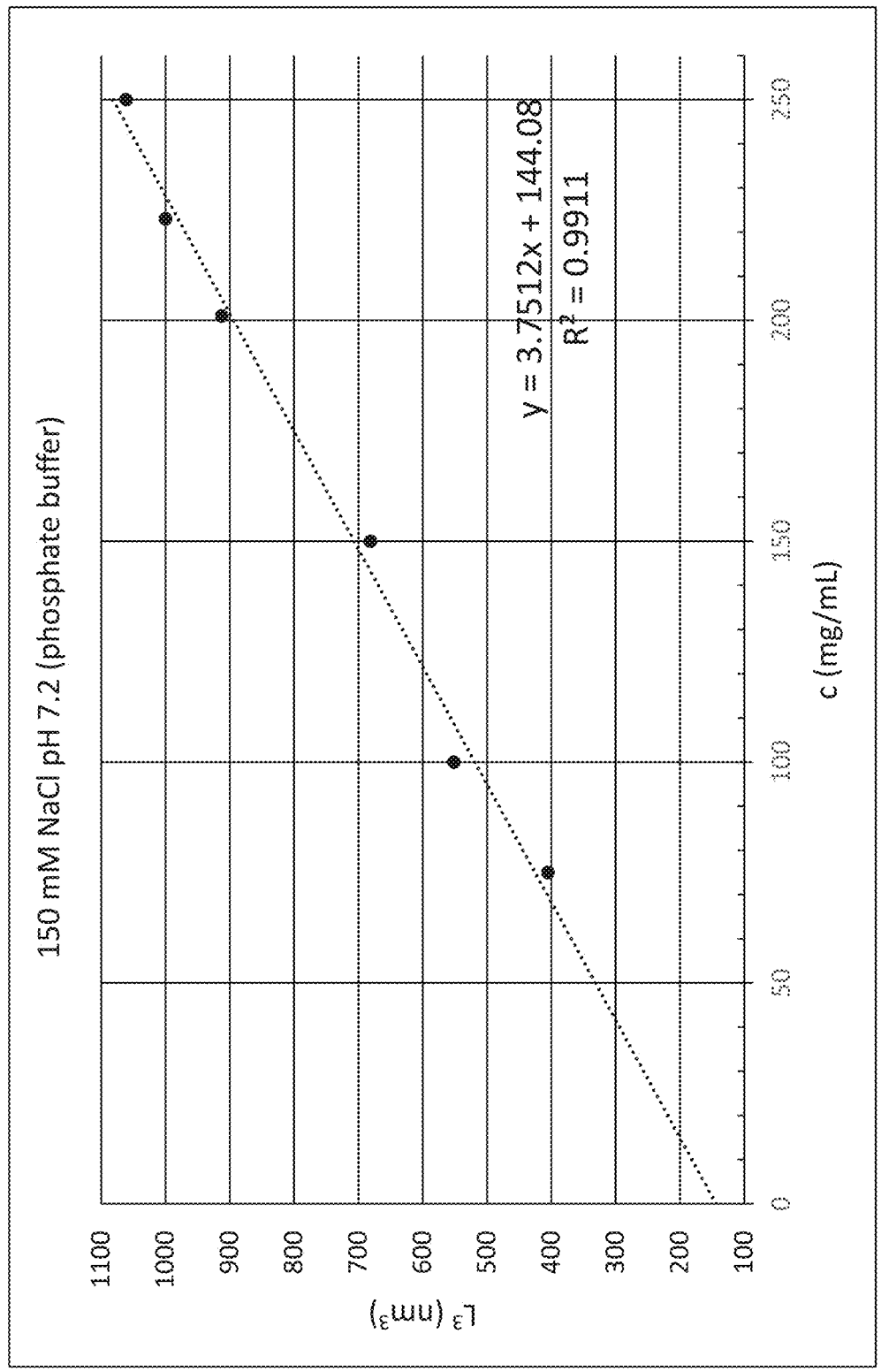
FIG. 11 shows changes in size of the associates of protein molecule in solutions with concentration.

FIG. 11 shows the exemplary data of $L^3$ of bovine gamma globulin solutions as the concentration is varied in a phosphate buffer saline solution at pH of 7.2 and 150 mM NaCl. As shown, the characteristic length increases with the concentration suggesting that larger clusters are formed with higher bovine gamma globulin concentration. As explained above, a measurement of a viscosity at multiple shear rates allows determination of the critical shear rate, from which the characteristic length can be determined. Thus, a rapid measurement of the viscosity at multiple shear rates allows a rapid determination of the characteristic length, which facilitates study of protein molecules.

Figure 12:
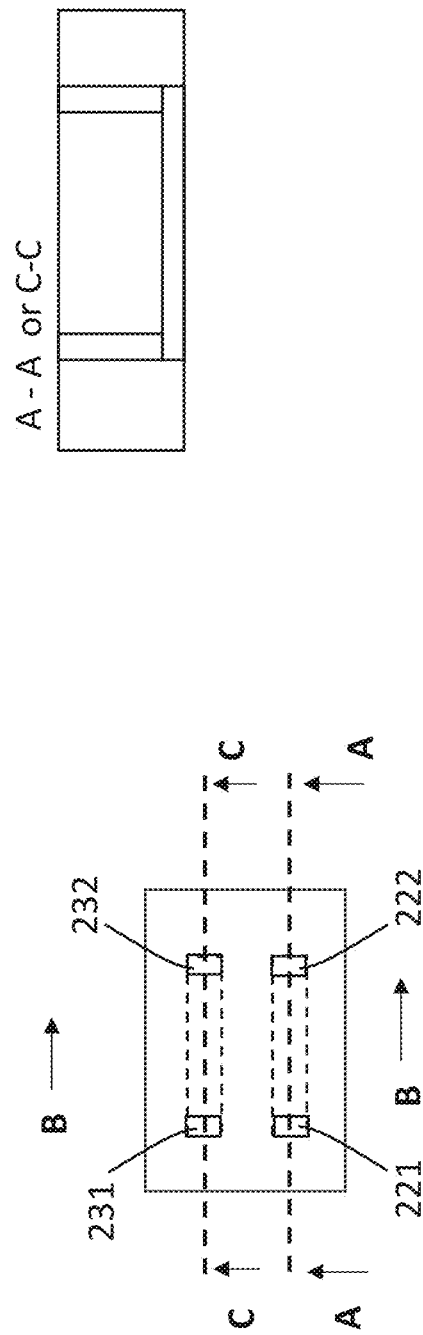
FIG. 12 is a schematic diagram illustrating a flow cell with multiple flow channels and pressure sensor arrays in accordance with some embodiments.

FIG. 12 shows an alternative design of the viscosity sensor chip in accordance with some embodiments. While FIG. 9 shows two viscosity chips that are mounted in line (e.g., the viscosity chips 48 and 49 are positioned linearly to each other and associated flow channels 46 and 47 are also positioned linear to each other), FIG. 12 shows the two flow channels (A-A and C-C) are positioned side-by-side to each other (e.g., parallel to each other without being positioned on a single common line). For example, a first flow channel (extending along A-A) is coupled with ports 221 and 222, and a second flow channel (extending along C-C) is coupled with ports 231 and 232. In some embodiments, the port 221 is an inlet and the port 222 is an outlet of the first flow channel and the port 231 is an outlet and the port 232 is an inlet of the second flow channel. In some configurations, the port 222, operating as the outlet of the first flow channel, is coupled to the port 232 operating as the inlet of the second flow channel so that a sample liquid that passed through the first flow channel is provided into the second flow channel. In some other embodiments, the port 221 is an inlet and the port 222 is an outlet of the first flow channel and the port 231 is an inlet and the port 232 is an outlet of the second flow channel. In some configurations, the port 222, operating as the outlet of the first flow channel, is coupled to the port 231 operating as the inlet of the second flow channel so that a sample liquid that passed through the first flow channel is provided into the second flow channel. In some configurations, a sample liquid is not provided concurrently to the port 221 operating as the inlet of the first flow channel and the port 231 operating as the inlet of the second flow channel (e.g., using a split channel, such as a Y-split channel).

In some embodiments, the viscosity sensor module described with respect to FIGS. 9-12 are used in a viscometer described with respect to FIGS. 1-7B. In some embodiments, certain features described with respect to FIGS. 1-7B are applicable to the viscosity sensor module described with respect to FIGS. 9-12 (e.g., the dead-volume of the viscosity sensor module described with respect to FIGS. 9-12 may be reduced by the designs and methods described with respect to FIGS. 1-7B). For brevity, such details are not repeated herein.

In light of these principles and examples, we turn to certain embodiments.

In accordance with some embodiments, a viscometer includes a viscosity sensor with a liquid flow channel for measuring a viscosity of a liquid flowing through the liquid flow channel; a manifold with an inlet and an outlet for receiving a liquid sample through the inlet of the manifold and providing the received liquid sample through the outlet of the manifold to the viscosity sensor; and a pump coupled with the manifold for causing an in-flow of the liquid sample into the manifold through the inlet of the manifold and an out-flow of the received liquid sample from the manifold through the outlet of the manifold.

In some embodiments, the manifold is configured to receive the liquid sample through the inlet of the manifold at a first time and provide the received liquid sample through the outlet of the manifold at a second time that is mutually exclusive to the first time.

In some embodiments, the manifold includes a first valve coupled with the inlet of the manifold and a second valve coupled with the outlet of the manifold.

In some embodiments, the first valve and the second valve are independently activable.

In some embodiments, the first valve is mechanically coupled with the second valve so that closing the first valve opens the second valve and opening the first valve closes the second valve.

In some embodiments, an area of a cross section of a valve seal hole of the first valve is substantially the same as an area of a cross section of the inlet of the manifold.

In some embodiments, an area of a cross section of a valve seal hole of the second valve is substantially the same as an area of a cross section of the outlet of the manifold.

In some embodiments, the manifold includes a rotatable valve plug.

In some embodiments, the rotatable valve plug, in a first rotational position, opens the inlet of the manifold and closes the outlet of the manifold and, in a second rotational position distinct from the first rotational position, closes the inlet of the manifold and opens the outlet of the manifold.

In some embodiments, a motor coupled with the rotatable valve plug to rotate the rotatable valve plug for opening one of the inlet of the manifold and the outlet of the manifold and closing the other of the inlet of the manifold and the outlet of the manifold.

In some embodiments, the pump includes a syringe pump with a plunger slidably coupled with a barrel.

In some embodiments, the manifold has a coupling hole for coupling with the pump, and a cross section of the coupling hole is substantially the same as, or larger than, a cross section of the plunger so that the plunger is slidable at least partially into the manifold.

In some embodiments, the viscosity sensor includes two or more pressure sensors positioned along the liquid flow channel for measuring a pressure drop of the liquid flowing through the liquid flow channel.

In some embodiments, the viscosity sensor has an inlet for receiving the liquid sample from the manifold.

In some embodiments, the viscometer includes a gasket positioned adjacent to the inlet of the viscosity sensor, wherein the gasket defines a hole and an area of a cross section of the hole is substantially the same as an area of a cross section of the inlet of the viscosity sensor.

In some embodiments, the viscometer includes a second viscosity sensor with a second liquid flow channel for measuring a viscosity of a liquid flowing through the second liquid flow channel. The manifold has a second inlet and a second outlet for receiving a second liquid sample through the second inlet of the manifold and providing the received second liquid sample through the second outlet of the manifold to the second viscosity sensor.

In some embodiments, the viscometer includes a second pump coupled with the manifold for causing an in-flow of the second liquid sample into the manifold through the second inlet of the manifold and an out-flow of the received second liquid sample from the manifold through the second outlet of the manifold.

In some embodiments, the pump is coupled with the manifold for causing an in-flow of the second liquid sample into the manifold through the second inlet of the manifold and an out-flow of the received second liquid sample from the manifold through the second outlet of the manifold.

In some embodiments, the viscometer includes a second viscosity sensor with a second liquid flow channel for measuring a viscosity of a liquid flowing through the second liquid flow channel; and a second manifold with a second inlet and a second outlet for receiving a second liquid sample through the second inlet of the second manifold and providing the received second liquid sample through the second outlet of the second manifold to the second viscosity sensor.

In some embodiments, the viscometer includes a second pump coupled with the second manifold for causing an in-flow of the second liquid sample into the second manifold through the second inlet of the second manifold and an out-flow of the received second liquid sample from the second manifold through the second outlet of the second manifold.

In some embodiments, the pump is coupled with the second manifold for causing an in-flow of the second liquid sample into the second manifold through the second inlet of the second manifold and an out-flow of the received second liquid sample from the second manifold through the second outlet of the second manifold.

In some embodiments, the viscometer includes a temperature controller coupled with the viscosity sensor for controlling a temperature of a liquid entering the viscosity sensor.

In some embodiments, the viscometer includes one or more microprocessors coupled with the viscosity sensor for receiving information indicating the viscosity of the liquid.

In some embodiments, the viscometer includes one or more displays for displaying the viscosity of the liquid flowing through the liquid flow channel.

In accordance with some embodiments, a viscosity sensor module includes a first viscosity sensor with a first liquid flow channel for measuring a viscosity of a liquid flowing through the first liquid flow channel; and a second viscosity sensor with a second liquid flow channel for measuring a viscosity of a liquid flowing through the second liquid flow channel.

In some embodiments, the first viscosity sensor includes at least two pressure sensors positioned along the first liquid flow channel for measuring a pressure drop of the liquid flowing through the first liquid flow channel; and the second viscosity sensor includes at least two pressure sensors positioned along the second liquid flow channel for measuring a pressure drop of the liquid flowing through the second liquid flow channel.

In some embodiments, the two pressure sensors of the first viscosity sensor have a first full-scale pressure; and the two pressure sensors of the second viscosity sensor have a second full-scale pressure that is distinct from the first full-scale pressure.

In some embodiments, the first full-scale pressure is at least five times greater than the second full-scale pressure.

In some embodiments, the first viscosity sensor has an inlet and an outlet. The second viscosity sensor has an inlet and an outlet. The outlet of the first viscosity sensor is coupled with the inlet of the second viscosity sensor so that a liquid output from the outlet of the first viscosity sensor is provided to the inlet of the second viscosity sensor.

In some embodiments, the first flow channel has a first cross-sectional area; and the second flow channel has a second cross-sectional area that is distinct from the first cross-sectional area.

In some embodiments, the second cross-sectional area is greater than the first cross-sectional area.

In some embodiments, the first flow channel has a first depth; and the second flow channel has a second depth that is distinct from the first depth.

In some embodiments, the second depth is greater than the first depth.

In some embodiments, the first depth is 20 µm or smaller and the second depth is 45 µm or greater.

In some embodiments, the viscosity sensor module includes a viscosity sensor chip membrane including silicon.

In some embodiments, the viscosity sensor module includes a substrate. In some embodiments, the substrate includes borosilicate glass.

In some embodiments, the substrate (e.g., borosilicate glass) is bonded to a silicon membrane by anodic bonding or laser bonding.

In accordance with some embodiments, a method includes, with a viscometer including any viscosity sensor module described herein, measuring viscosity values of a liquid containing protein molecules at a plurality of shear rates; and determining a size of aggregates from the measured viscosity values for analyzing an interaction of the protein molecules in the liquid.

In some embodiments, the plurality of shear rates includes an on-set shear rate of shear thinning for the liquid containing protein molecules and one or more shear rates lower than the on-set shear rate.

The foregoing description, for purpose of explanation, has been described with reference to specific embodiments. However, the illustrative discussions above are not intended to be exhaustive or to limit the scope of claims to the precise forms disclosed. Many modifications and variations are possible in view of the above teachings. The embodiments were chosen and described in order to best explain the principles of the various described embodiments and their practical applications, to thereby enable others skilled in the art to best utilize the principles and the various described embodiments with various modifications as are suited to the particular use contemplated.

What is claimed is:

1. A viscometer, comprising:
   a viscosity sensor with a liquid flow channel for measuring a viscosity of a liquid flowing through the liquid flow channel;
   a manifold with an inlet and an outlet for receiving a liquid sample through the inlet of the manifold and providing the received liquid sample through the outlet of the manifold to the viscosity sensor; and
   a pump coupled with the manifold for causing an in-flow of the liquid sample into the manifold through the inlet of the manifold and an out-flow of the received liquid sample from the manifold through the outlet of the manifold, wherein:
   the manifold includes a first valve coupled with the inlet of the manifold and a second valve coupled with the outlet of the manifold; and
   the first valve is mechanically coupled with the second valve so that closing the first valve opens the second valve and opening the first valve closes the second valve.

2. The viscometer of claim 1, wherein:
   the manifold is configured to receive the liquid sample through the inlet of the manifold at a first time and provide the received liquid sample through the outlet of the manifold at a second time that is mutually exclusive to the first time.

3. The viscometer of claim 1, wherein:
   an area of a cross section of a valve seal hole of the first valve is substantially the same as an area of a cross section of the inlet of the manifold.

4. The viscometer of claim 1, wherein:
   an area of a cross section of a valve seal hole of the second valve is substantially the same as an area of a cross section of the outlet of the manifold.

5. The viscometer of claim 1, wherein:
   the pump includes a syringe pump with a plunger slidably coupled with a barrel.

6. The viscometer of claim 5, wherein:
   the manifold has a coupling hole for coupling with the pump; and
   a cross section of the coupling hole is substantially the same as, or larger than, a cross section of the plunger so that the plunger is slidable at least partially into the manifold.

7. The viscometer of claim 1, wherein:
   the viscosity sensor includes two or more pressure sensors positioned along the liquid flow channel for measuring a pressure drop of the liquid flowing through the liquid flow channel.

8. The viscometer of claim 1, wherein:
   the viscosity sensor has an inlet for receiving the liquid sample from the manifold.

9. The viscometer of claim 8, further comprising:
   a gasket positioned adjacent to the inlet of the viscosity sensor, wherein the gasket defines a hole and an area of a cross section of the hole is substantially the same as an area of a cross section of the inlet of the viscosity sensor.

10. The viscometer of claim 1, further comprising:
    a second viscosity sensor with a second liquid flow channel for measuring a viscosity of a liquid flowing through the second liquid flow channel,
    wherein the manifold has a second inlet and a second outlet for receiving a second liquid sample through the second inlet of the manifold and providing the received second liquid sample through the second outlet of the manifold to the second viscosity sensor.

11. The viscometer of claim 1, further comprising:
    a second viscosity sensor with a second liquid flow channel for measuring a viscosity of a liquid flowing through the second liquid flow channel; and
    a second manifold with a second inlet and a second outlet for receiving a second liquid sample through the second inlet of the second manifold and providing the received second liquid sample through the second outlet of the second manifold to the second viscosity sensor.

12. The viscometer of claim 1, further comprising:
    a temperature controller coupled with the viscosity sensor for controlling a temperature of a liquid entering the viscosity sensor.

13. The viscometer of claim 1, further comprising:
    one or more microprocessors coupled with the viscosity sensor for receiving information indicating the viscosity of the liquid.

14. The viscometer of claim 1, further comprising:
    one or more displays for displaying the viscosity of the liquid flowing through the liquid flow channel.

15. A viscometer, comprising: wherein:
    a viscosity sensor with a liquid flow channel for measuring a viscosity of a liquid flowing through the liquid flow channel;
    a manifold with an inlet and an outlet for receiving a liquid sample through the inlet of the manifold and providing the received liquid sample through the outlet of the manifold to the viscosity sensor; and
    a pump coupled with the manifold for causing an in-flow of the liquid sample into the manifold through the inlet of the manifold and an out-flow of the received liquid sample from the manifold through the outlet of the manifold, wherein:
    the manifold includes a rotatable valve plug.

16. The viscometer of claim 15, wherein:
    the rotatable valve plug, in a first rotational position, opens the inlet of the manifold and closes the outlet of the manifold and, in a second rotational position distinct from the first rotational position, closes the inlet of the manifold and opens the outlet of the manifold.

17. The viscometer of claim 16, wherein:
    the viscosity sensor has an inlet for receiving the liquid sample from the manifold; and
    the viscometer further includes a gasket positioned adjacent to the inlet of the viscosity sensor, wherein the gasket defines a hole and an area of a cross section of the hole is substantially the same as an area of a cross section of the inlet of the viscosity sensor.

18. The viscometer of claim 16, wherein:
    the pump includes a syringe pump with a plunger slidably coupled with a barrel;
    the manifold has a coupling hole for coupling with the pump; and
    a cross section of the coupling hole is substantially the same as, or larger than, a cross section of the plunger so that the plunger is slidable at least partially into the manifold.

19. The viscometer of claim 15, further comprising:
a motor coupled with the rotatable valve plug to rotate the rotatable valve plug for opening one of the inlet of the manifold and the outlet of the manifold and closing the other of the inlet of the manifold and the outlet of the manifold.

20. The viscometer of claim 19, wherein:
the viscosity sensor has an inlet for receiving the liquid sample from the manifold; and
the viscometer further includes a gasket positioned adjacent to the inlet of the viscosity sensor, wherein the gasket defines a hole and an area of a cross section of the hole is substantially the same as an area of a cross section of the inlet of the viscosity sensor.

* * * * *